United States Patent
Evans et al.

(10) Patent No.: US 9,449,449 B2
(45) Date of Patent: Sep. 20, 2016

(54) ACCESS CONTROL OPERATOR DIAGNOSTIC CONTROL

(71) Applicant: The Chamberlain Group, Inc., Elmhurst, IL (US)

(72) Inventors: Patrick B. Evans, Elmhurst, IL (US); Edward Sullivan, Addison, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 0 days.

(21) Appl. No.: 14/473,045

(22) Filed: Aug. 29, 2014

(65) Prior Publication Data

US 2014/0361866 A1 Dec. 11, 2014

Related U.S. Application Data

(63) Continuation-in-part of application No. 13/833,575, filed on Mar. 15, 2013.

(51) Int. Cl.
*B60R 25/00* (2013.01)
*G05B 19/00* (2006.01)
(Continued)

(52) U.S. Cl.
CPC ......... *G07C 9/00857* (2013.01); *H04L 63/102* (2013.01); *H04W 4/001* (2013.01);
(Continued)

(58) Field of Classification Search
CPC ............ G05B 19/00; E05Y 2900/106; E05Y 2400/66; E05Y 2201/43; E05Y 2900/148; G07C 9/00309; G07C 9/00103; E05F 15/2076; B60R 25/04; G06F 3/017; H04W 88/02; G06K 19/0723; H04M 1/72522
USPC ............. 340/5.61, 5.7, 5.71; 455/420–422.1; 49/357
See application file for complete search history.

(56) References Cited

U.S. PATENT DOCUMENTS

| | | | |
|---|---|---|---|
| 4,360,801 A | 11/1982 | Duhame | |
| 4,408,251 A | 10/1983 | Kaplan | |

(Continued)

FOREIGN PATENT DOCUMENTS

| | | |
|---|---|---|
| EP | 0422190 | 10/1990 |
| EP | 846991 | 11/1997 |

(Continued)

OTHER PUBLICATIONS

"Now You Can Close Your Garage Door With a Smartphone;" Copyright 2011 USA Today; http://content.usatoday.com/communities/driveon/post/2011/09/now-you-can-control-your-garage-door-from-your-smartphone.

(Continued)

*Primary Examiner* — George Bugg
*Assistant Examiner* — Munear Akki
(74) *Attorney, Agent, or Firm* — Fitch Even Tabin & Flannery LLP

(57) ABSTRACT

A computing device using diagnostic application software described herein allows an owner or operator of a premises to provide a service technician access to operational data from a movable barrier operator so that the technician's computing device can troubleshoot for possible issues with the operation of the barrier operator. The owner's computing device can send credentials to the technician mobile device so that the technician's computing device can then utilize the application to access the operational data. For added security, the application can further give the owner computing device control over the type and duration of access provided to the technician.

37 Claims, 12 Drawing Sheets

(51) Int. Cl.
  *G05B 23/00* (2006.01)
  *E05F 11/00* (2006.01)
  *H04W 4/00* (2009.01)
  *H04B 7/00* (2006.01)
  *H04M 1/00* (2006.01)
  *G07C 9/00* (2006.01)
  *H04W 12/08* (2009.01)
  *H04L 29/06* (2006.01)

(52) U.S. Cl.
  CPC ... *H04W 12/08* (2013.01); *G05B 2219/24158* (2013.01); *G07C 9/00309* (2013.01); *G07C 2009/00865* (2013.01); *H04W 4/008* (2013.01)

(56) References Cited

U.S. PATENT DOCUMENTS

| | | |
|---|---|---|
| 4,464,651 A | 8/1984 | Duhame |
| 4,533,905 A | 8/1985 | Leivenzon |
| 4,583,081 A | 4/1986 | Schmitz |
| 4,629,874 A | 12/1986 | Pugsley |
| 4,821,024 A | 4/1989 | Bayha |
| 4,922,224 A | 5/1990 | Drori |
| 5,047,928 A | 9/1991 | Wiedemer |
| 5,155,680 A | 10/1992 | Wiedemer |
| 5,191,268 A | 3/1993 | Duhame |
| 5,402,105 A | 3/1995 | Doyle |
| 5,444,440 A | 8/1995 | Heydendahl |
| 5,565,843 A | 10/1996 | Meyvis |
| 5,596,840 A | 1/1997 | Teich |
| 5,608,778 A | 3/1997 | Partridge, III |
| 5,656,900 A | 8/1997 | Michel |
| 5,689,236 A | 11/1997 | Kister |
| 5,731,756 A | 3/1998 | Roddy |
| 5,780,987 A | 7/1998 | Fitzgibbon |
| 5,781,107 A | 7/1998 | Ji |
| 5,805,064 A | 9/1998 | Yorkey |
| 5,883,579 A | 3/1999 | Schreiner |
| 5,917,405 A | 6/1999 | Joao |
| 5,969,637 A | 10/1999 | Doppelt |
| 6,011,468 A | 1/2000 | Lee |
| 6,028,537 A | 2/2000 | Suman |
| 6,070,361 A | 6/2000 | Paterno |
| 6,127,740 A | 10/2000 | Roddy |
| 6,131,019 A | 10/2000 | King |
| 6,154,544 A | 11/2000 | Farris |
| 6,161,005 A | 12/2000 | Pinzon |
| 6,166,634 A | 12/2000 | Dean |
| 6,184,641 B1 | 2/2001 | Crimmins |
| 6,192,282 B1 | 2/2001 | Smith |
| 6,225,903 B1 | 5/2001 | Soloway |
| 6,266,540 B1 | 7/2001 | Edgar, III |
| 6,278,249 B1 | 8/2001 | Fitzgibbon |
| 6,310,548 B1 | 10/2001 | Stephens, Jr. |
| 6,326,754 B1 | 12/2001 | Mullet |
| 6,346,889 B1 | 2/2002 | Moss |
| 6,388,559 B1 | 5/2002 | Cohen |
| 6,400,265 B1 | 6/2002 | Saylor |
| RE37,784 E | 7/2002 | Fitzgibbon |
| 6,484,784 B1 | 11/2002 | Weik, III |
| 6,525,645 B2 | 2/2003 | King |
| 6,553,238 B1 | 4/2003 | Ginzel |
| 6,553,881 B2 | 4/2003 | Marmin |
| 6,561,255 B1 | 5/2003 | Mullet |
| 6,564,056 B1 | 5/2003 | Fitzgerald |
| 6,597,291 B2 | 7/2003 | Tsui |
| 6,661,340 B1 | 12/2003 | Saylor et al. |
| 6,686,838 B1 | 2/2004 | Rezvani |
| 6,781,516 B2 | 8/2004 | Reynard |
| 6,782,662 B2 | 8/2004 | McCartney |
| 6,812,849 B1 | 11/2004 | Ancel |
| 6,833,681 B2 | 12/2004 | Fitzgibbon |
| 6,891,838 B1 | 5/2005 | Petite |
| 6,903,650 B2 | 6/2005 | Murray |
| 6,924,727 B2 | 8/2005 | Nagaoka |
| 6,933,843 B1 | 8/2005 | Hom |
| 6,975,226 B2 | 12/2005 | Reynard |
| 6,980,117 B1 | 12/2005 | Kirkland |
| 6,989,760 B2 | 1/2006 | Dierking |
| 6,998,977 B2 | 2/2006 | Gregori |
| 7,057,494 B2 | 6/2006 | Fitzgibbon |
| 7,071,850 B1 | 7/2006 | Fitzgibbon |
| 7,091,688 B2 | 8/2006 | Gioia |
| 7,127,847 B2 | 10/2006 | Fitzgibbon |
| 7,161,319 B2 | 1/2007 | Ergun |
| 7,161,466 B2 | 1/2007 | Chuey |
| 7,170,998 B2 | 1/2007 | McLintock |
| 7,192,278 B2 | 3/2007 | Cao |
| 7,197,278 B2 | 3/2007 | Harwood |
| 7,207,142 B2 * | 4/2007 | Mullet ............... E05F 15/77 340/686.1 |
| 7,221,289 B2 | 5/2007 | Hom |
| 7,269,416 B2 | 9/2007 | Guthrie |
| 7,274,300 B2 | 9/2007 | Duvernell |
| 7,310,043 B2 | 12/2007 | Mamaloukas |
| 7,331,144 B2 | 2/2008 | Parsadayan |
| 7,332,999 B2 | 2/2008 | Fitzgibbon |
| 7,370,074 B2 | 5/2008 | Alexander |
| 7,380,375 B2 | 6/2008 | Maly |
| 7,464,403 B2 | 12/2008 | Hardman, Jr. |
| 7,468,676 B2 | 12/2008 | Styers |
| 7,482,923 B2 | 1/2009 | Fitzgibbon |
| 7,493,726 B2 | 2/2009 | Fitzgibbon |
| 7,561,075 B2 | 7/2009 | Fitzgibbon |
| 7,741,951 B2 | 6/2010 | Fitzgibbon |
| 7,761,186 B2 | 7/2010 | Keller |
| 7,778,604 B2 | 8/2010 | Bauman |
| 7,852,212 B2 | 12/2010 | Fitzgibbon |
| 7,876,218 B2 | 1/2011 | Fitzgibbon |
| 7,983,160 B2 | 7/2011 | Gunatilake |
| 7,983,180 B2 | 7/2011 | Harrington |
| 7,994,896 B2 | 8/2011 | Fitzgibbon |
| 7,995,460 B2 | 8/2011 | Edgar, III |
| 8,040,217 B2 | 10/2011 | Fitzgibbon |
| 8,063,592 B2 | 11/2011 | Shier |
| 8,144,011 B2 | 3/2012 | Fitzgibbon |
| 8,175,591 B2 | 5/2012 | Fitzgibbon |
| 8,207,818 B2 | 6/2012 | Keller, Jr. |
| 8,239,481 B2 | 8/2012 | Alexander |
| 8,290,515 B2 | 10/2012 | Staton |
| 8,368,509 B2 | 2/2013 | Fitzgibbon |
| 8,416,054 B2 | 4/2013 | Fitzgibbon |
| 8,561,348 B2 | 10/2013 | Kurth |
| 8,587,404 B2 | 11/2013 | Laird |
| 8,797,138 B2 | 8/2014 | Myers |
| 2001/0011941 A1 | 8/2001 | King |
| 2001/0017483 A1 | 8/2001 | Frohberg |
| 2002/0014954 A1 | 2/2002 | Fitzgibbon |
| 2002/0033760 A1 | 3/2002 | Kobayashi |
| 2002/0162175 A1 | 11/2002 | Berglund |
| 2002/0180600 A1 | 12/2002 | Kirkland |
| 2002/0183008 A1 | 12/2002 | Menard |
| 2003/0098778 A1 | 5/2003 | Taylor |
| 2003/0151493 A1 | 8/2003 | Straumann et al. |
| 2003/0216139 A1 | 11/2003 | Olson |
| 2004/0036573 A1 | 2/2004 | Fitzgibbon |
| 2004/0210327 A1 * | 10/2004 | Robb ............... E06B 9/68 700/90 |
| 2004/0212498 A1 | 10/2004 | Peterson |
| 2004/0219903 A1 * | 11/2004 | Despain ............ G07C 9/00023 455/410 |
| 2004/0257189 A1 | 12/2004 | Chang |
| 2004/0257199 A1 | 12/2004 | Fitzgibbon |
| 2005/0012631 A1 | 1/2005 | Gregori |
| 2005/0033641 A1 | 2/2005 | Jha |
| 2005/0076242 A1 | 4/2005 | Breuer |
| 2005/0113080 A1 * | 5/2005 | Nishimura ......... G07C 9/00103 455/420 |
| 2005/0134426 A1 | 6/2005 | Mullet |
| 2005/0170777 A1 | 8/2005 | Harwood |
| 2005/0174250 A1 | 8/2005 | Dierking |
| 2005/0195066 A1 | 9/2005 | Vandrunen |
| 2005/0272372 A1 | 12/2005 | Rodriguez |
| 2005/0273372 A1 | 12/2005 | Bowne |

(56) References Cited

U.S. PATENT DOCUMENTS

| | | |
|---|---|---|
| 2006/0027939 A1 | 2/2006 | Brait |
| 2006/0077035 A1 | 4/2006 | Mamaloukas |
| 2006/0103503 A1 | 5/2006 | Rodriquez |
| 2006/0132284 A1 | 6/2006 | Murphy |
| 2006/0137261 A1 | 6/2006 | Maly |
| 2006/0158344 A1 | 7/2006 | Bambini |
| 2006/0170533 A1* | 8/2006 | Chioiu ............... G07C 9/00103 340/5.61 |
| 2006/0223518 A1* | 10/2006 | Haney .................. H04W 12/08 455/420 |
| 2006/0261932 A1 | 11/2006 | Ando |
| 2006/0279399 A1 | 12/2006 | Chuey |
| 2007/0005605 A1 | 1/2007 | Hampton |
| 2007/0028339 A1 | 2/2007 | Carlson |
| 2007/0058811 A1 | 3/2007 | Fitzgibbon |
| 2007/0146118 A1 | 6/2007 | Rodriguez |
| 2007/0177740 A1* | 8/2007 | Nakajima ........... G06F 21/6218 380/277 |
| 2007/0183597 A1 | 8/2007 | Bellwood |
| 2007/0185597 A1 | 8/2007 | Bejean |
| 2008/0061926 A1 | 3/2008 | Strait |
| 2008/0108301 A1 | 5/2008 | Dorenbosch |
| 2008/0224886 A1* | 9/2008 | Rodriguez ......... G07C 9/00182 340/13.28 |
| 2008/0303706 A1 | 12/2008 | Keller |
| 2009/0102651 A1 | 4/2009 | Fitzgibbon |
| 2009/0160637 A1 | 6/2009 | Maeng |
| 2009/0302997 A1* | 12/2009 | Bronstein ............... H04L 9/321 340/5.54 |
| 2010/0090796 A1* | 4/2010 | Perez ..................... E06B 9/68 340/5.7 |
| 2010/0141381 A1* | 6/2010 | Bliding .............. G07C 9/00309 340/5.61 |
| 2010/0242360 A1 | 9/2010 | Dyas |
| 2010/0242369 A1* | 9/2010 | Laird .................... E05F 15/684 49/358 |
| 2010/0289661 A1 | 11/2010 | Styers |
| 2010/0299517 A1 | 11/2010 | Jukic |
| 2011/0055909 A1* | 3/2011 | Dowlatkhah ........... G06F 21/31 726/6 |
| 2011/0084798 A1 | 4/2011 | Fitzgibbon |
| 2011/0109426 A1* | 5/2011 | Harel et al. ................... 340/5.6 |
| 2011/0130134 A1* | 6/2011 | Van Rysselberghe ....... A47G 29/141 455/422.1 |
| 2011/0193700 A1 | 8/2011 | Fitzgibbon |
| 2011/0234367 A1 | 9/2011 | Murphy |
| 2011/0254685 A1 | 10/2011 | Karasek |
| 2011/0311052 A1 | 12/2011 | Myers |
| 2012/0098638 A1 | 4/2012 | Crawford |
| 2012/0249289 A1 | 10/2012 | Freese |
| 2013/0060357 A1 | 3/2013 | Li |
| 2013/0060358 A1 | 3/2013 | Li |
| 2013/0093563 A1* | 4/2013 | Adolfsson .......... G07C 9/00031 340/5.7 |
| 2013/0151977 A1 | 6/2013 | Arteaga-King |
| 2013/0290191 A1* | 10/2013 | Dischamp ............. H04L 63/061 705/51 |
| 2013/0328663 A1 | 12/2013 | Ordaz |
| 2014/0051425 A1* | 2/2014 | Ahearn ................. H04W 4/008 455/420 |
| 2014/0333412 A1* | 11/2014 | Lewis ................ G07C 9/00031 340/5.2 |

FOREIGN PATENT DOCUMENTS

| | | |
|---|---|---|
| EP | 1151598 | 6/2000 |
| JP | 2002019548 | 1/2002 |
| JP | 2004088774 | 3/2004 |
| JP | 4864457 | 2/2012 |
| KR | 2002032461 | 5/2002 |
| WO | 9012411 | 10/1990 |
| WO | 0036812 | 6/2000 |
| WO | 0193220 | 12/2001 |
| WO | 2009088901 | 7/2009 |

OTHER PUBLICATIONS

4Sight Internet Brochure; http://4sightsolution.4frontes.com/document/4CB-4S00-0809; Carrollton, TX; 2009; 5 pgs.

828LM—LiftMaster Internet Gateway; http://www.liftmastercom/consumerweb/pages/accessoriesmodeldetaiLaspx? modelld=2407; printed Oct. 30, 2012.

ActieHome PC Home Automation System; http://www.x10.com/promotions/sw31a_activehome_hmp.html?WENTY11; accessed Sep. 2011.

Arrayent; White Paper: Six System Requirements for an Internet-Connected Product Line; Copyright 2010; http://arrayent.com/pdfs/SixSystemRequirementsforInternetConnectedProductsLine.pdf.

Automatic Garage Door Closer Manual—Protectrix 18A—Dated Mar. 31, 2009.

Bill Peisel; "Designing the Next Step in Internet Applicances" Electronic Design/Mar. 23, 1998.

Canadian Patent Application No. 2,533,795; Second Office Action Dated Dec. 30, 2013.

Combined Search and Examination Report Cited in British Patent Application No. GB1025649.5 Dated Aug. 8, 2012.

Examination Report from New Zealand Patent Application No. 599055 dated Apr. 3, 2012.

Examination Report Under Section 18(3) Cited in British Patent Application No. GB1205649.5 Dated May 29, 2013.

Examination Report Under Section 18(3) for GB1205649.5 Dated Feb. 12, 2014.

Examination Report Under Section 18(3) for GB1205649.5 Dated Jun. 11, 2014.

EZSrve-Insteon/X10 Home Automation Gateway—Model #5010L; hap://www.simplehomenet.com/proddetail.asp?prod+9357342317, accessed Sep. 2011.

First Office Action mailed Aug. 8, 2014 in related U.S. Appl. No. 13/671,602.

Fully-Loaded ActiveHome Pro PC Hom Automation System; http://www.x10.com/promotions/cm15a_loaded_ps.html ; accessed Sep. 2011.

George Lawton; "Dawn of the Internet Appliance" Computer, Industry Trends; Oct. 1, 1997.

Hassan A. Artail; "A Distributed System of Network-Enabled Microcontrollers for Controlling and Monitoring Home Devices" IEEE 2002.

Hawking Technologies HomeRemote Wireless Home Automation Gateway Pro Starter Kit; The HRGZ2 HomeRemote Gateway; Smart Home Systems, Inc.; http://www.smarthomeusa.com/ShopByManufacturer/Hawking-Technologies/Item/HRPS1/; Accessed Sep. 2011.

HomeRemote Wireless Home Automation Gateway—PracticallyNetworked.com; Review date Aug. 2007; http://222.practical-lynetworked.com/review.asp?pid=690; Accessed Sep. 2011.

HomeSeer HS2—Home Automation Software; http://store.homeseer.com/store/ HomeSeer-HS2-Home-Automation-Software-Download-P103.aspx; Accessed Sep. 2011.

How to Internet-Connect Your Low Cost Consumer Retail Embedded Design; How to Prototype an Internet Connect Product; Hershy Wanigasekara; Sep. 13, 2010; http://www.eetimes.com/design/embedded/4027637/Internet-Connect-your-low-cost-consumer-retail-embedded-design.

How to Internet-Connect Your Low Cost Consumer Retail Embedded Design; How to Prototype an Internet Connected Product; Hershy Wanigasekara; Sep. 13, 2010; http://www.eetimes.com/design/embedded/4027637/Internet-Connect-your-low-cost-consumer-retail-embedded-design.

How to Internet-Connect Your Low Cost Consumer Retail Embedded Design; Internet Connect Product Implementation Design Patterns; Hershy Wanigasekara; Sep. 13, 2010; http://www.eetimes.com/design/embedded/4027637/Internet-Connect-your-low-cost-consumer-retail-embedded-design.

(56) References Cited

OTHER PUBLICATIONS

Ian Bryant and Bill Rose; "Home Systems: Home Controls;" p. 1-322; © 2001 Parks Associates.
Infinias Mobile Credential App for Android DroidMill; Known and printed as early as Dec. 19, 2011; http://droidmill.com/infinias-mobile-credential-1364120.html.
Intelli-M eIDC32; Ethernet-Enabled Integrated Door Controller; www.infinias.com; Known and printed as early as Dec. 19, 2011.
Internet Connected Garage Door Opener; Open New Doors at Sears; http://www.sears.corri/shc/s/p__10153__12605__00930437000P?prdNo=1&blockNo=1&blockType=G1; printed Oct. 30, 2012.
K.K. Tan, Y.L. Lim and H.L. Goh; "Remote Adaptive Control and Monitoring" IEEE (c) 2002.
Kenmore Connect; http:/www.kenmore.com/shc/s/dap__10154__12604_DAP_Kenmore+Connect; 2010 Sears Brands, LLC.
Kurt Scherf, Michael Greeson and Tricia Parks; "Primary Perspectives: "E-Enabled" Home Security;" pp. 1-87; © 2003 Parks Associates.
LiftMaster; MyQ Enabled Accessory: LiftMaster Internet Gateway (Model 828); Known as of Dec. 19, 2011.
Liftmaster Debuts New Intelligence in Garage Door Openers at IDS 2011; New Generation of LiftMaster Models and Accessories Enabled by MyQ Technology; Elmhurst, IL; Jun. 7, 2011; http://www.liftmaster.com/NR/rdonlyres/0A903511-21AB-4F0A-BBCD-196D41503CF2/4305/LiftMasterUneilsMyQTechnologyIDA2011_FINAL.pdf.
LiftMaster Internet Gateway: Your Simple Solution to Home Control; http://www.liftmaster.com/consumerweb/products/Introducing LiftMasterInternetGateway, printed Oct. 30, 2012.
MiCasa Verde.com—Vers2; http://www.micasaverde.com/vera.php; Accessed Sep. 2011.
Miele's Remote Vision Explained; http://www.miclensa.com/service/remote_vision/verify.aspx; Accessed Feb. 2012.
Office Action Mailed May 19, 2013 in U.S. Appl. No. 14/010,143.
Peter M. Corcoran and Joe Desbonnet; "Browser-Style Interfaces to a Home Automation Network" Manuscript received Jun. 18, 1997, IEEE (c) 1997.
Press Release; Kenmore Uneils Reolutionary Technology Enabling Laundry Applicances to 'Talk' to Customer Serice Experts; PR Newswire, pNA, Aug. 4, 2010.
Protectrix Wireless automatic Garage Door Closer Timer Opener Security Accessory; http://www.closethegarage.com; printed Oct. 30, 2012.
Somfy's Slick Tahoma Z-Wire and RTS Home Automatation Gateway; Thomas Ricker; posted Jan. 4, 2011; http://www.engadget.com/2011/01/04/softys-tahoma-z-wave-and-rts-home-automation-gateway/.
Stephen Shankland; "Need to lend your key? E-Mail it, Frauhofer says" news.cnet.com/8301-1035_3-57572338-94/need-to-lend-your-key-e-mail-it-fraunhofer-says/; pp. 1-5; CNET News, Mar. 4, 2013.
Summary of Findings From Parks Associates\ Early Reports; pp. 9-13; Apr. 15, 2013 by Parks Associates.
Susan Cotterell, Frank Vahid, Walid Najjar, and Harry Hsieh; "First Results with eBlocks: Embedded Systems Building Blocks" University of California, Rkverside pp. 168-175; Codes+ISSS'03, Oct. 1-3, 2003.
The Craftsman Brant Announces Garage Door Opener of the Future—PR Newswire; The Sacramento Bee; http://www.sac bee.com/2011/09/27/2941742/the-craftsman-brand-announces.html; Sep. 27, 2011.
The Intelli-M eIDC32; True IP Access Control; htto://www.infinias.com/main/Products/eIDCController.aspx; Known and printed as early as Dec. 19, 2011.
ULStandard for Safety for Door, Drapery, Gate, Louver, and Window Operators and Systems, UL 325 Fifth Edition, Dated Jun. 7, 2002; pp. 1-186.
Universal Devices—ISY-99i Series; http://www.universal-devices.com/99i.htm; Accessed Sep. 2011.

Wayne-Dalton Press Area—New Z-Wave enabled prodrive; http://www.wayne-dalton.com/newsitem98.asp; Printed Oct. 13, 2011.
www.brinkshomesecurity.com/home-security-systems-and-pricing/security-equipment/security-equipment.htm as printed on Feb. 11, 2009.
Xanboo XPC280 Wireless Universal Garage Door Control—Smarthome; http://www.smartphone.comf75066/Xanboo-XPC280-Wireless-Universal-Garage-Door-Control/p.aspx, printed Oct. 30, 2012.
4th Usenix; Windows Systems Symposium; Seattle, Washington USA; Aug. 3-4, 2000; A Toolkit for Building Dependable and Extensible Home Networking Applications; Yi-Min Wang, Wilf Russell and Anish Arora.
6POWER, IPv6 and PLC for home automation; Terena 2004; Jordi Palet & Francisco Ortiz.
Authentication vs. Encryption; Be in Control with Control Networks; Feb. 10, 2004; http://www.buildings.com/DesktcpModulesIBB ArlicleMaxfArticleDeta I/BBArticleDetai IPrintaspx7ArlicleID=1740& Template=standm-d_Pri nt.ascx &siteID= 1.
Big blue builds home network technology; McCune, Heather; http://search.proquest.com/docview/194229104?accountid=12492; Apr. 2003.
Controlling the Status Indicator Module of the Stanley Garage Door Opener Set; Rene Braeckman; Apr. 6, 2000.
Defendant's Motion to Dismiss Second Amended Complaint Due to Patent Invalidity Under 35 U.S.C. § 101; NDIL Case 14-cv-05197; Mar. 17, 2015.
Detroit Free Press Home Computing Column; Detroit Free; Newman, Heather; http ://search.proquest.com/docview/4632707 4 7?accountid=12492; Knight Ridder/Tribune Business News; © 2002, last updated Dec. 13, 2011.
Diomidis D. Spinellis; The information furnace: consolidated home control; Received: Jun. 1, 2002 / Accepted: Aug. 14, 2002; © Springer-Verlag London Limited 2003.
Doug Olenick; Motorola Broadens Home Automation Line; http ://search.proquest.com/docview/232255560?accountid=12492; vol. 20, © Jan. 6, 2005; last updated Sep. 1, 2011.
International Conference on Sensors and Control Techniques (leSC 2000); Desheng Jiang, Anbo Wang, Fume and Temperature Alarm and Intelligent Control System of the District for Fire-Proof, Jun. 19-21, 2000, Wuhan, China, vol. 4077.
Memorandum in Support of Defendant\s Motion to Dismiss Second Amended Complaint Due to Patent Invalidity Under 35 U.S.C. § 101; NDIL Case 14-cv-05197; Exhibit A; U.S. Pat. No. 6,998,977; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit B; U.S. Pat. No. 7,852,212; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit C; U.S. Pat. No. 8,144,011; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit D; U.S. Pat. No. 7,876,218; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit E; U.S. Pat. No. 7,482,923; Mar. 17, 2015.
Memorandum in Support of Defendant\s Motion to Dismiss Second Amended Complaint Due to Patent Invalidity Under 35 U.S.C. § 101; NDIL Case 14-cv-05197; Exhibit F; U.S. Pat. No. 7,071,850; Mar. 17, 2015.
Memorandum in Support of Defendants Motion to Dismiss Second Amended Complaint Due to Patent Invalidity Under 35 U.S.C. § 101; NDIL Case 14-cv-05197; Exhibit G; Dictionary of Computer and Internet Terms; Douglas Downing; Michael A. Covington and Melody Mauidin Covington; Barrons; Mar. 17, 2015.

(56) References Cited

OTHER PUBLICATIONS

Memorandum in Support of Defendant\s Motion to Dismiss Second Amended Complaint Due to Patent Invalidity Under 35 U.S.C. § 101; NDIL Case 14-cv-05197; Mar. 17, 2015.
Net2 User Manual; Version 3; Paxton Access; "Date code: 281002". Search History; C:\APPS\EAST\workspaces\garage_door_status_indicator.wsp; p. 4, Apr. 25, 2005.
Secure Smart Homes using• Jini and UIUC SESAME; Jalal Al-Muhtadi et al.; 1063-9527/00 © 2000 IEEE.
Security System Installation Manual; Caretaker and Custom Versions; Interactive Technologies, Inc.; Issue Date May 5, 1994.
Security System Installation Manual; Caretaker and Custom Versions; Interactive Technologies, Inc.; Text No. 46-908-01 Rev. A; 1995.
Smart Networks for Control; Reza S. Raji;IEEE Spectrum Jun. 1994.
Svein Anders Tunheim; Wireless Home Automation Systems Require Low Cost and Low Power RF-IC Solutions; Wireless Home Automation Systems (rev. 1.0) May 16, 2002; p. 1 of 8.
The iDorm—a Practical Deployment of Grid Technology; Anthony Pounds-Cornish, Arran Holmes; Intelligent Interactive Environments Group, University of Essex, UK; Proceedings of the 2nd IEEE/ACM International Symposium on Cluster Computing and the Grid (CCGRIO'02) 0-7695-1582-7/02 © 2002 IEEE.
The Information Furnace: Consolidated Home Control; Diomidis D. SpinellisDepartment Management Science and Technology Athens University of Economics and Business; Personal and Ubiquitous Computing archive; vol. 7 Issue 1, May 2003.
The Information Furnace: User-friendly Home Control; Diomidis D. Spinellis, Department Management Science and Technology, Athens University of Economics and Business; SANE 2002; 3rd Int'l Sys. Admin. and Networking Conf. Proc., pp. 145-175, May 2002.
Towards Dependable Home Networking: An Experience Report; Yi-Min Wang, Wilf Russell, Anish Arora, JunXu, Rajesh K. Jagannathan, Apr. 18, 2000, Technical Report, MSR-TR-2000-26, Microsoft Research, Microsoft Corporation.
Xanboo Future Product; http://www.xanboo.com/xanproducts/newproducts.htm Feb. 2002, Xanboo Inc.
XPress Access; Simple Personal Management; © 2001 Andover Controls Corporation BR-XPACCESS-A.

* cited by examiner

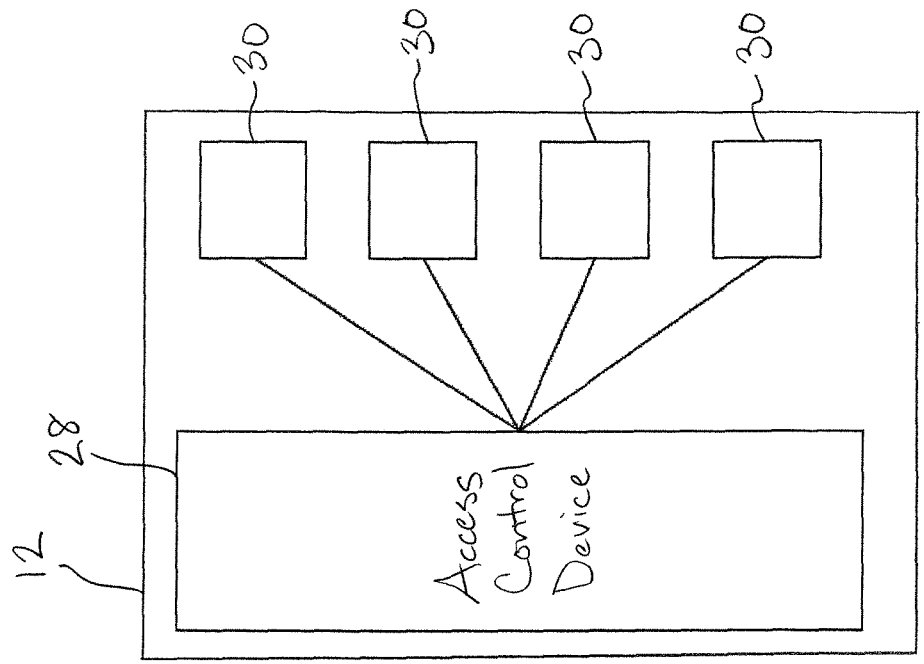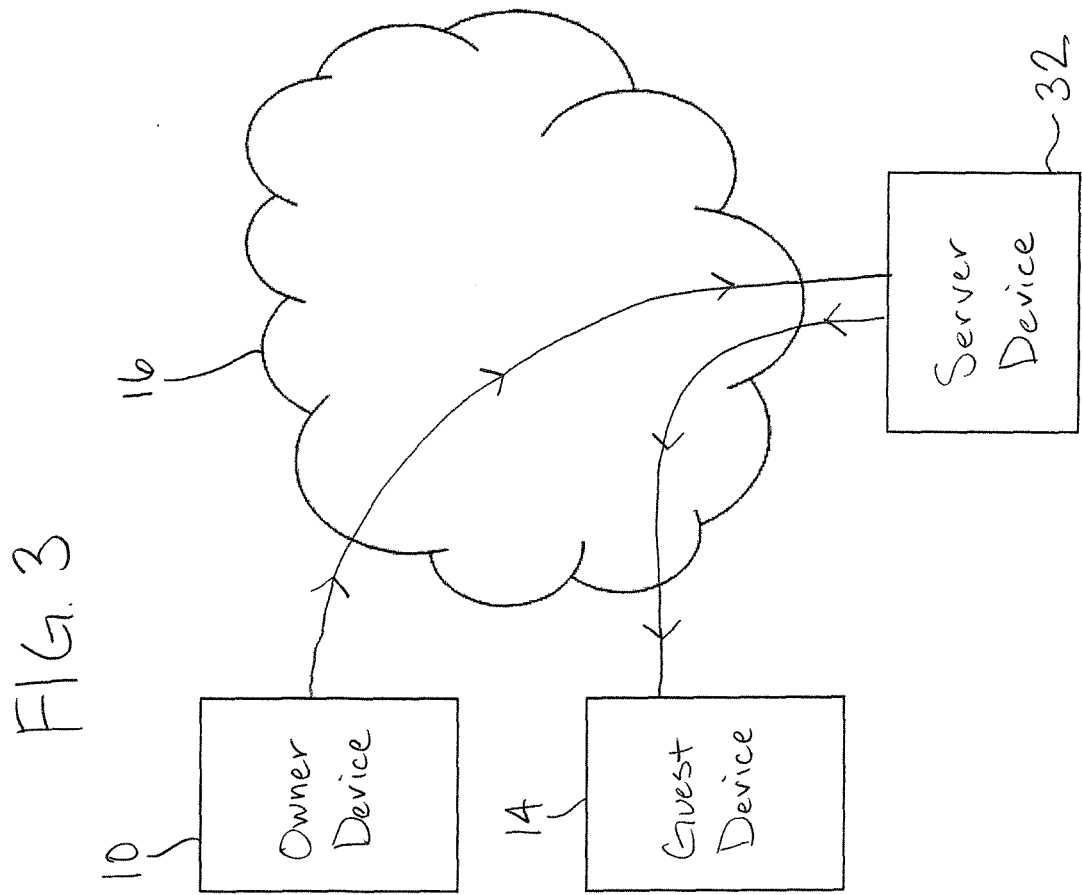
FIG. 3

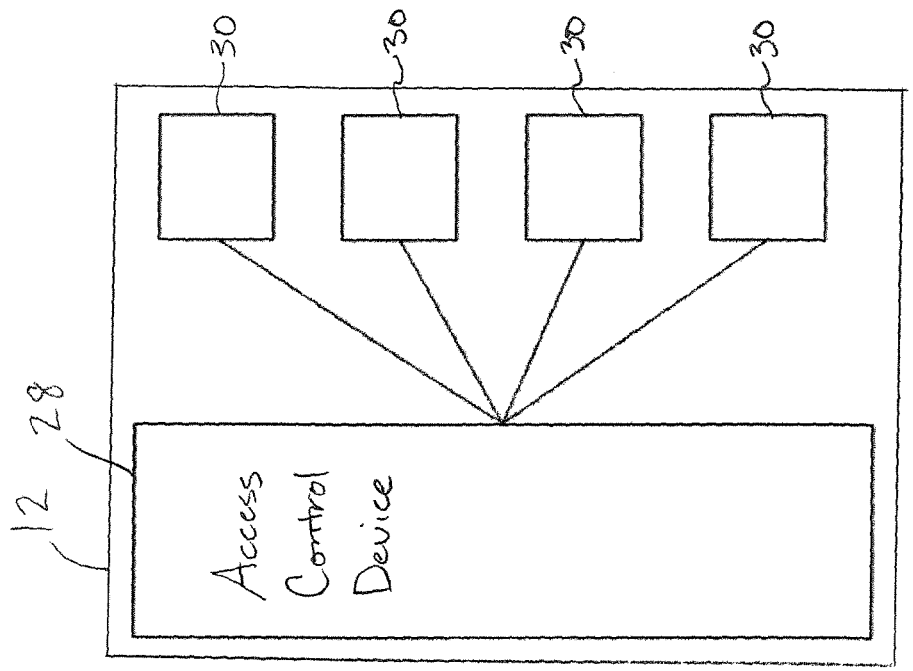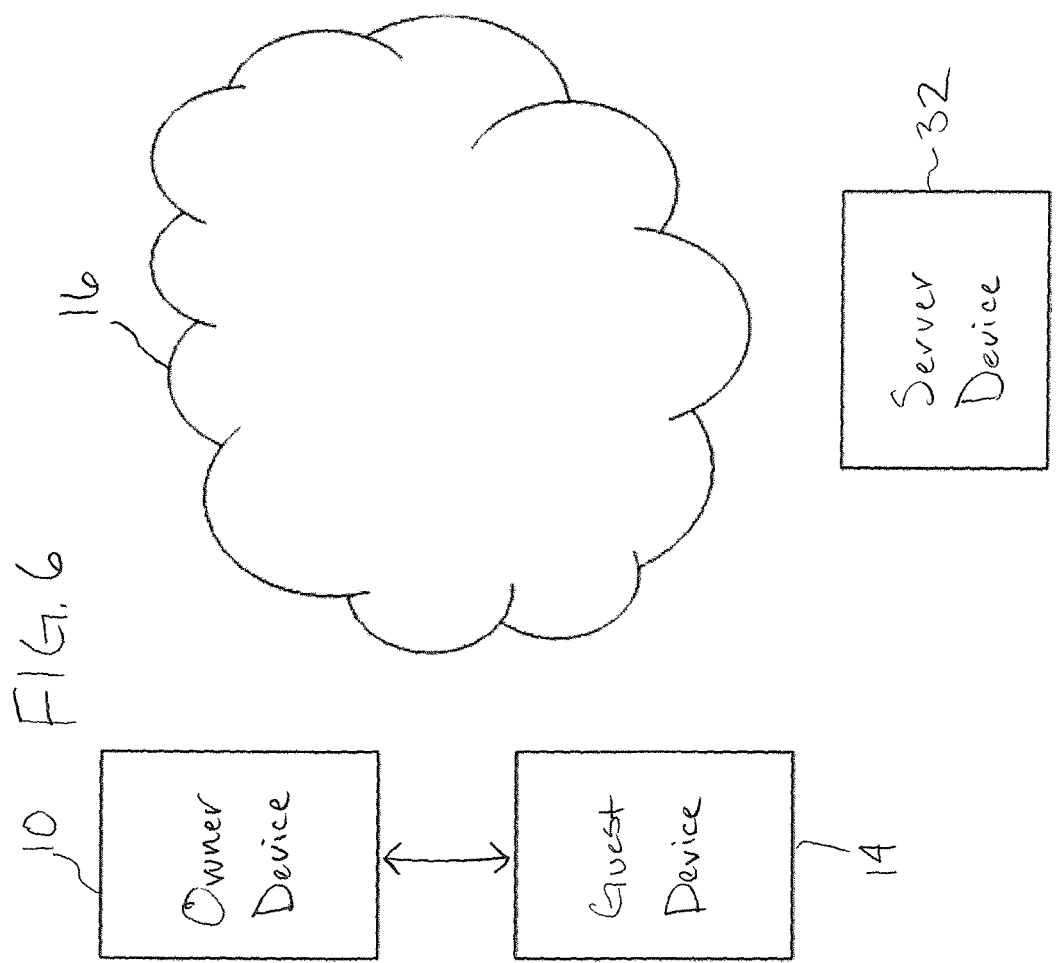
FIG. 6

ACCESS CONTROL OPERATOR DIAGNOSTIC CONTROL

CROSS-REFERENCE TO RELATED APPLICATIONS

This application is a continuation-in-part of U.S. patent application Ser. No. 13/833,575, filed Mar. 15, 2013, which is hereby incorporated by reference herein in its entirety.

FIELD

The present application relates to movable barriers such as overhead doors and the like, particularly barrier operators in which a drive force is applied to the overhead door by a motor.

BACKGROUND

Providing guest or other third party access to a premises secured by a movable barrier can present numerous difficulties. If an owner or operator of the premises is present, the owner can actuate the operator and provide access to the guest, but this can inconvenience the owner if the owner is in a meeting or otherwise busy. Access can become even more difficult when an owner is absent from the premises.

Wireless transmitters are commonly used to send signals to barrier operators to open and close movable barriers associated with the barrier operators. In order for a guest to obtain access with such a transmitter, however, an absent owner, or someone at the behest of the owner, would have to physically deliver one of the wireless transmitters to the guest. This situation can undesirably waste time and resources. Moreover, this can leave an owner without a wireless transmitter if there are a limited amount of transmitters available and requires the owner to reacquire the wireless transmitter from the guest.

Another method of actuating a barrier operator includes providing a stationary keypad or other interface outside of the premises that can open and close a movable barrier in response to entry of the appropriate code. With such a setup, an owner can provide a guest with the appropriate code. This enables the owner to provide access to the premises without additional expenditures of time or resources, but disadvantageously also enables the guest to reenter the premises so long as the code remains the same. Thus, if the owner wishes to prevent the guest from being able to reenter the premises, the owner must change and memorize a new code. Such a setup can become onerous with multiple guests needing access to the premises.

Additionally, with advances in technology, barrier operators are being produced with an increasing number of features and options. While providing the customer with more utility, the additional features make diagnosis and troubleshooting of problems during operation increasingly difficult. This is especially true when a consumer requests service help over the phone or internet

SUMMARY

A method, apparatus, mobile device application software, and computer-readable medium is provided herein that allows an owner or operator of a secured area within a premises to send control device access rights to a guest over a communication network. Pursuant to this, the owner can send, or cause to be sent by a third party device, such as a server device, an application to a mobile computing device or telephone device that is configured to be operated on the mobile device. The application includes information necessary to access and operate the control device at the premises, such as a movable barrier operator, monitoring device, home automation device, and/or alarm device. As such, after receiving the transmission of the application at the guest mobile device, the application can then be installed and/or run on the mobile device. The application can advantageously be configured by the owner of the premises to restrict the access rights granted by the application. For example, the application can restrict access rights of the guest mobile device to a specific time period on one day, certain time periods for a number of days, certain days during a week, etc. Moreover, the application can provide increased security by including a notification configuration to notify the owner or other responsible party if the guest mobile device attempts to operate the control device outside of these sets time periods.

A method, apparatus, mobile device application software, and computer-readable medium is also provided herein that allows an owner or operator to permit a service technician to access operational data of a barrier operator to troubleshoot operational issues and diagnose problems. The application facilitates communication and exchange of information between the owner and service technician so that a barrier operator can be efficiently serviced or repaired without requiring the owner to be physically present. The application can further provide several safety measures for an owner to prevent full access or prevent unintended access to the barrier operator and the area it secures.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 3 is a schematic diagram showing communication to send access rights to a guest device from an owner device to a third party server device to the guest device;

FIG. 6 is a schematic diagram showing communication to send access rights to a guest device from an owner device using near field communication;

DETAILED DESCRIPTION

Figure 1:
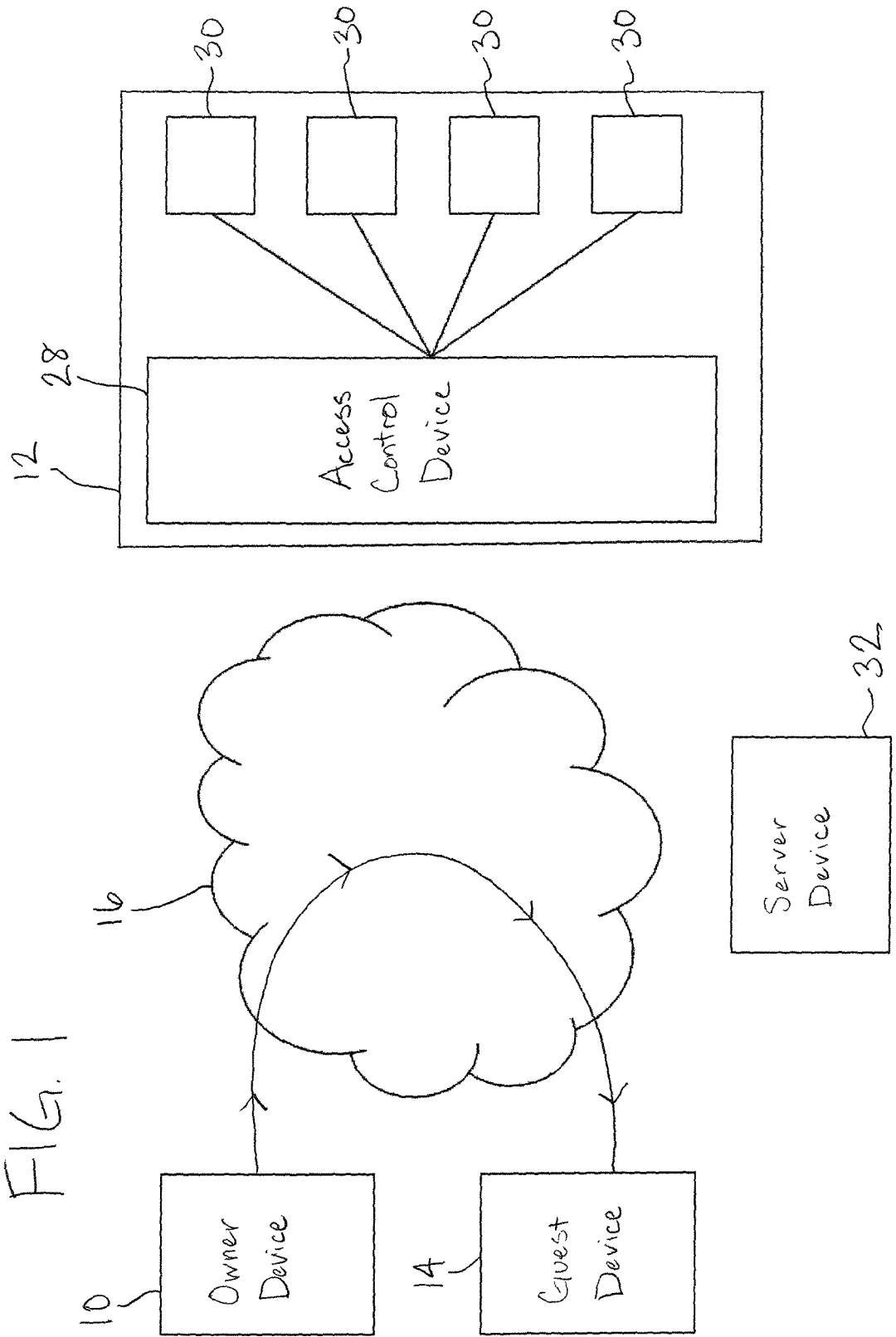
FIG. 1 is a schematic diagram showing communication to send access rights to a guest device from an owner device to the guest device.

Application software for a mobile device can provide an owner or operator of a premises with the ability to remotely grant a guest authorization to access an access control device on or in the premises. The access control device can control the operation of the one or more secondary devices, so that with the owner authorization, the guest can access the access control device to cause an action at the premises with the secondary device. The application software can further provide the owner/operator the ability to restrict the third party access, such as temporally or spatially.

The following terms, which will be used throughout the disclosure herein, can have a variety of suitable meanings. For example, when used herein, an "owner" of a premises or secured area can refer to any person with the authority to authorize a guest to access the access control device on a premises or secured area. In a straightforward situation, the owner can personally own the premises, such as with a home or business, and has the authority to authorize access to a guest, such as an independent contractor, employee, customer, or personal acquaintance. The disclosure herein, however, works equally well, with an example of a corporation or other business having any number of employees. In this situation, the owner would refer to a person in a position of authority, such as a CEO, president, vice-president, manager, security personnel, and the like. Without limitation, the disclosure herein can provide an owner of a premises having an access control device therein the ability to remotely grant a guest access to and the ability to send a control signal to the access control device. Similarly, "premises" can refer to a residential structure, commercial structure, industrial structure, or other secured area, or portion(s) thereof.

Details of the interacting components and structure of the system disclosed herein are shown in FIGS. 1-12. As illustrated, an owner operated communication device 10, a guest operated communication device 14, a server device 32, and an access control device 28 are capable of communication with one another through one or more communication networks 16. Suitable communication networks 16 can include, without limitation, the internet, a cellular network, Bluetooth, or other communication medium, or a combination thereof. The owner device 10 and guest device 14 can be any suitable communication device, such as a mobile phone, tablet, computing device, E-reader, communication enabled vehicle, or the like.

Figure 12:
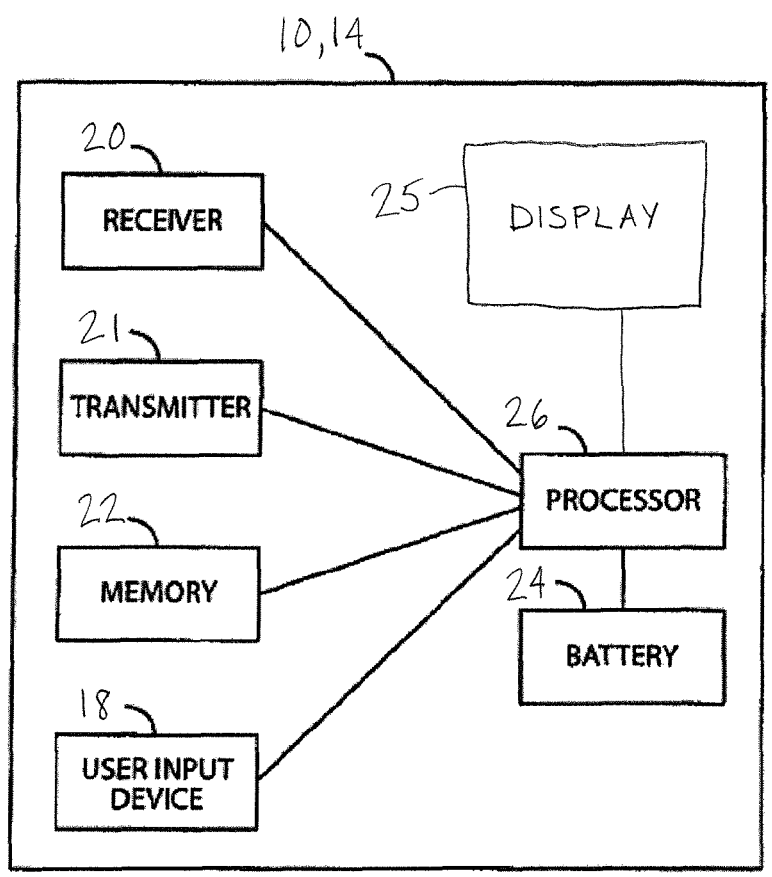
FIG. 12 is a block diagram of a communication device suitable for an owner device or a guest device.

As shown in FIG. 12, the owner device 10 and the guest device 14 each include a user input 18, such as a touch screen, keypad, switch device, voice command software, or the like, a receiver 20, a transmitter 21, a memory 22, a power source 24, which can be replaceable or rechargeable as desired, a display 25, and a processing device 26 controlling the operation thereof. As commonly understood, the components are connected by electrical pathways, such as wires, traces, circuit boards, and the like.

The access control device 28 is located in or around a premises or secured area 12. The access control device 28 is configured, in response to receipt of a properly authorized control signal, to control operation of one or more secondary devices 30 in or on the premises 12. By a first approach, the access control device 28 can be part of or integrated within the secondary device 30. For example, without limitation, the secondary device 30 can refer to a movable barrier operator, such as a garage door operator, door access control, gate operator, commercial door operator, and the like, a home automation system, an alarm system, a server device, a computing device, a network device, or the like. In this approach, the access control device 28 can directly receive the control signal to open or close a movable barrier, lock or unlock one or more doors, activate or deactivate appliances, lights, and the like within the premises 12, activate or deactivate an alarm, and the like.

By a second approach, the access control device 28 can be a separate gateway device capable of receiving the authorized control signal and translating the signal to a language understood by one of the specific secondary devices 30 as discussed above.

Turning now to details of the application software ("application"), the application can be available for purchase and/or download from any website, online store, or vendor over the communication network 16. Alternatively, a user can download the application onto a personal computer and transfer the application to a suitable device. In this instance, the owner downloads and installs the application on the owner device 10. When operation is desired, the owner runs the application on the owner device 10 by a suitable selection through the user input 18.

The application utilizes access rights data that includes identification information of the access control device 28 and corresponding authorization information for access rights to the access control device 28. In other words, the access rights data includes credentials required by the access control device 28, a conditional requirement for allowing the credentials, and the identification information of the access control device 28. If desired, the application can cause the access rights data to be stored in the memory 22 of the owner device 10. This information can be manually entered by the owner through the user input 18 of the owner device 10, by download from the access control device 28, by retrieving or receiving the access rights data from a network device, or the application can have a learn mode similar to a learning transmitter known in the art so that the owner device 10 receives and stores the information from a transmission of an authorized transmitter. Thus, if desired, the application can provide the owner with transmitter functionality to send an authorized control signal to the access control device 28 with the owner device 10.

Advantageously, the application further grants the owner the ability to send the access rights data to one or more guest devices 14. In other words, in response to instruction of the owner through the application, the application can transmit the access rights data or cause the access rights data to be transmitted to the guest device 14, which then provides the guest device 14 the ability to send an authorized control signal to the access control device 28 to operate the secondary devices 30.

The guest can acquire the application in any number of suitable ways. For example, the owner can cause an invitation or link to download and install the application to be sent to the guest device 14 through a suitable communication network, utilizing a short message service, a multimedia message service, an e-mail, a message through a third party website, or the like. This can be done by the owner with the owner device 10 through the application or independent thereof or can be done by the owner through a third party website or service. The owner can also vocally communicate with the guest with an identification and location of the application for the guest to download and install the application on the guest device 14.

Regardless of how the guest is notified of the application, the guest can then purchase, if necessary, download, and install the application on the guest device 14 similar to the operation of the owner device 10 discussed above. With the application installed on the guest device 14, the application can cause the guest device 14 to be receptive to a transmission at the behest of the owner device 10, which includes the access rights data. For example, the owner can input guest device identification information, such as a telephone number, email address, IP address, or the like, into the owner device 10 or an associated third party website and select to transmit the access rights data to the guest device 14, the communication of which will be described in greater detail below.

In response to reception of the access rights data from the owner device 10, the application running on the guest device 14 can then configure the guest device 14 to send an authorized control signal to the access control device 28 to allow the guest to operate the secondary device(s) 30. In one approach, the guest can instruct the application running on the guest device 14 to be receptive to the access rights data, such as in a learning mode, download the access rights data, such as from a third party server device, and/or store the access rights data in the memory 22. In another approach, the application can automatically store the access rights data in the memory 22 of the guest device 14. Then, when the guest desires access to the access control device 28, the guest can run the application on the guest device 14, which can retrieve the access rights data and transmit an authorized control signal through the guest device transmitter 21 to the access control device 28, such as through Bluetooth, a cellular network, the internet, or the like.

Specifically, the application can display a menu listing one or more premises by an identifier, such as an address, title, or the like, which can be customizable or editable, on the display 25 of the guest device 14. In response to selection of the premises in the listing through the user input 18, the application determines whether any restrictions on the access rights are applicable. If there are no restrictions applicable, in response to selection with the user input 18, the application can cause the transmitter 21 of the guest device 14 to transmit the authorized control signal to the access control device 28.

Alternatively, the application can prevent selection of the premises listing due to restrictions being applicable. For example, the application can display the premises listing in a grayed-out state, crossed-out, or the like. Additionally, the application can display the restrictions alongside or within the premises listing.

So configured, the owner can grant access rights to the guest without having to give the guest a physical key, a pass code, or having to be present to grant access. Moreover, the access rights data transmission, as well as the storage of the access rights data, can be encrypted by any suitable methods so that unwanted third parties and the guest cannot use the transmission or the application to gain unrestricted or uncontrolled access to the access rights data. Any suitable encryption scheme and method can be utilized. As such, the owner maintains control over access because the guest cannot make unauthorized copies, such as with a physical key, or share access with unauthorized people, such as with a pass code.

Advantageously, the application can also be used by the owner to restrict usage of the access rights sent to the guest device. Specifically, the application can allow the owner to enter restrictions on the access rights granted to the guest device 14, including, temporal restrictions, spatial restrictions, or combinations thereof. For example, if the access control device 28 controls the locking and unlocking of a door, the restrictions can prevent the guest device 14 from being able to unlock the door during specified times, such as specified hours of a day, one or more days during a week, or combinations thereof. In another example, if the premises 12 includes a series of locked doors, the restrictions can prevent the guest device 14 from being able to unlock specified doors so that the guest can only access selected areas of the premises.

The owner can input these restrictions or conditions into the application prior to the access rights data being sent to the guest device 14 so that the access rights data is sent with the restrictions to the guest device 14. As such, the application running on the guest device can restrict transmission of an authorized signal or can transmit the signal along with the restrictions configured to be interpreted by the access control device 28 to permit or deny the requested action based on analysis of the restrictions. Alternatively or in addition thereto, the owner can subsequently modify already granted access rights by inputting the restrictions into the owner device 10 and sending the restrictions or causing the restrictions to be sent to the guest device 14 to alter the authorized access rights stored on the guest device 14. By another approach, the owner device 10, can send the restrictions or conditions directly to the access control device 28. As such, the access control device 28 can access restrictions in response to reception of a signal from the guest device 14 and permit or deny the requested action based on the restrictions. By yet another approach, the owner device 10 can input the restrictions or conditions at an intermediary server 32, discussed in more detail below, or send the restrictions thereto. As such, the intermediary server 32 then controls the conditions placed on the authorization of the guest device to send signals to the access control device 28.

By another approach, the access rights can be sent to the guest device without any authorization for use. As such, the owner can subsequently send allowed or authorized spatial or temporal zones to the guest device or intermediary server 32, or identify the allowed or authorized spatial or temporal zones for subsequent sending by a third party.

Of course, the application also allows the owner to revoke the access rights, such as by sending a revocation transmission to the application on the guest device 14 or to a third party server device or service, which would then deactivate or delete the access rights data from the guest device 14.

The various options for transmitting the access rights from the owner device 10 to the guest device 14 are described below with reference to FIGS. 1-6.

In a first example, shown in FIG. 1, the owner device 10 communicates directly with the guest device 14 through the communication network, as discussed above. As such, the owner device 10 transmits the access rights data, with or without restrictions thereon as determined by the owner, directly to the guest device 14 by inputting identification information of the guest device 14, such as a telephone number, email address, IP address, SIM card, or the like into the owner device 10. The application then transmits the access rights data directly to the guest device 14.

Figure 2:
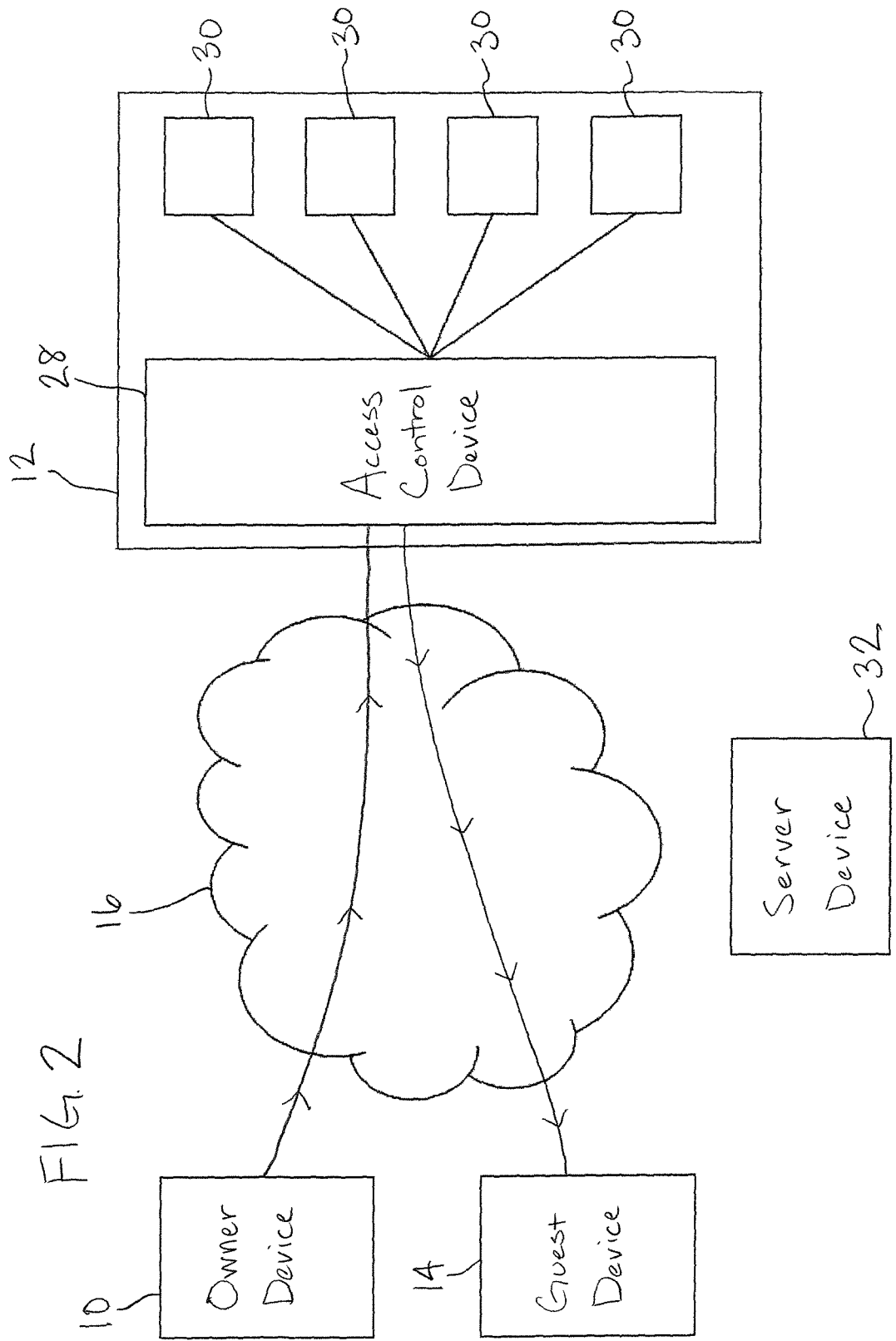
FIG. 2 is a schematic diagram showing communication to send access rights to a guest device from an owner device to an access control device to the guest device.

In another example, shown in FIG. 2, the owner device 10 transmits a request to the access control device 28 that the access control device 28 send the access rights data to the guest device 14. In response to reception of the request, the access control device 28 assumes the responsibility to send the access rights data to the guest device 14. The application on the owner device 10 can send the access rights data along with the request or the access control device 28 can send access rights data stored in its own system. The owner device 10 also transmits identification information of the guest device 14, so that the access control device 28 can identify the guest device 14 and transmit the access rights data or the application along with the access rights data to the guest device 14, similarly to that described above.

Turning now to FIG. 3, in this example the intermediary device 32 can facilitate communication between the owner device 10 and the guest device 14. The intermediary device 32 can be a server device, either owned by one of the parties to the transaction or owned by a separate third party, such as an owner and distributor of the application, the access control device, or both. By one approach, the access control device 28 can have the application installed thereon so that the device 28 can easily operate within the parameters of the application running on the owner and guest devices 10, 14. The owner device 10 transmits the request to the intermediary server, which then assumes responsibility for transmitting the access rights data to the guest device 14. As with the example of FIG. 2, the access rights data can be sent by the owner device 10 or the intermediary server 32 can have the access rights data stored thereon or have access to the access rights data in a separate database. In response to reception of the request, the intermediary server 32 transmits the access rights data, which can include the application, a link to a website to download the application, or identification information of the application, to the guest device 14.

Figure 4:
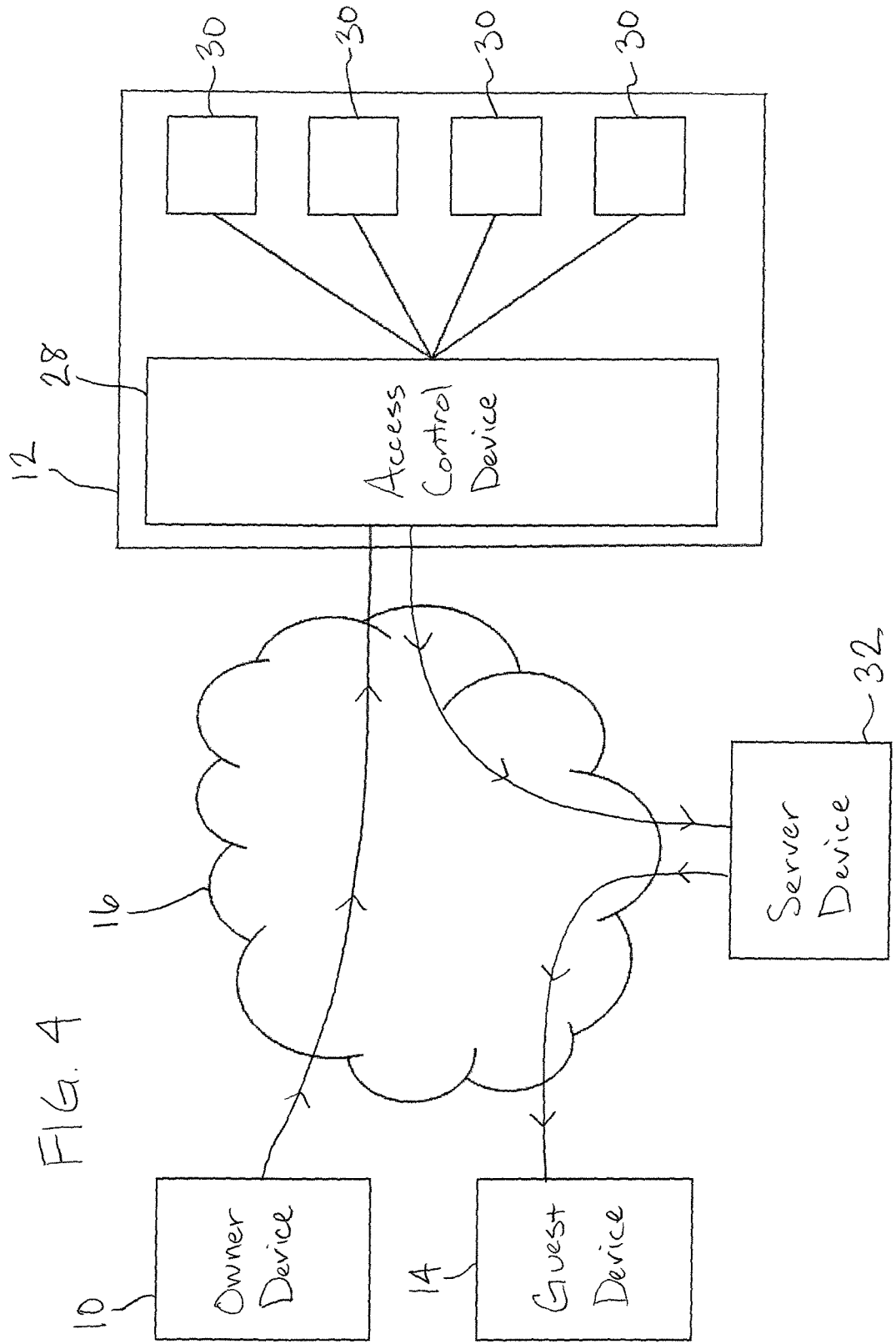
FIG. 4 is a schematic diagram showing communication to send access rights to a guest device from an owner device to an access control device to a third party server device to the guest device.
Figure 5:
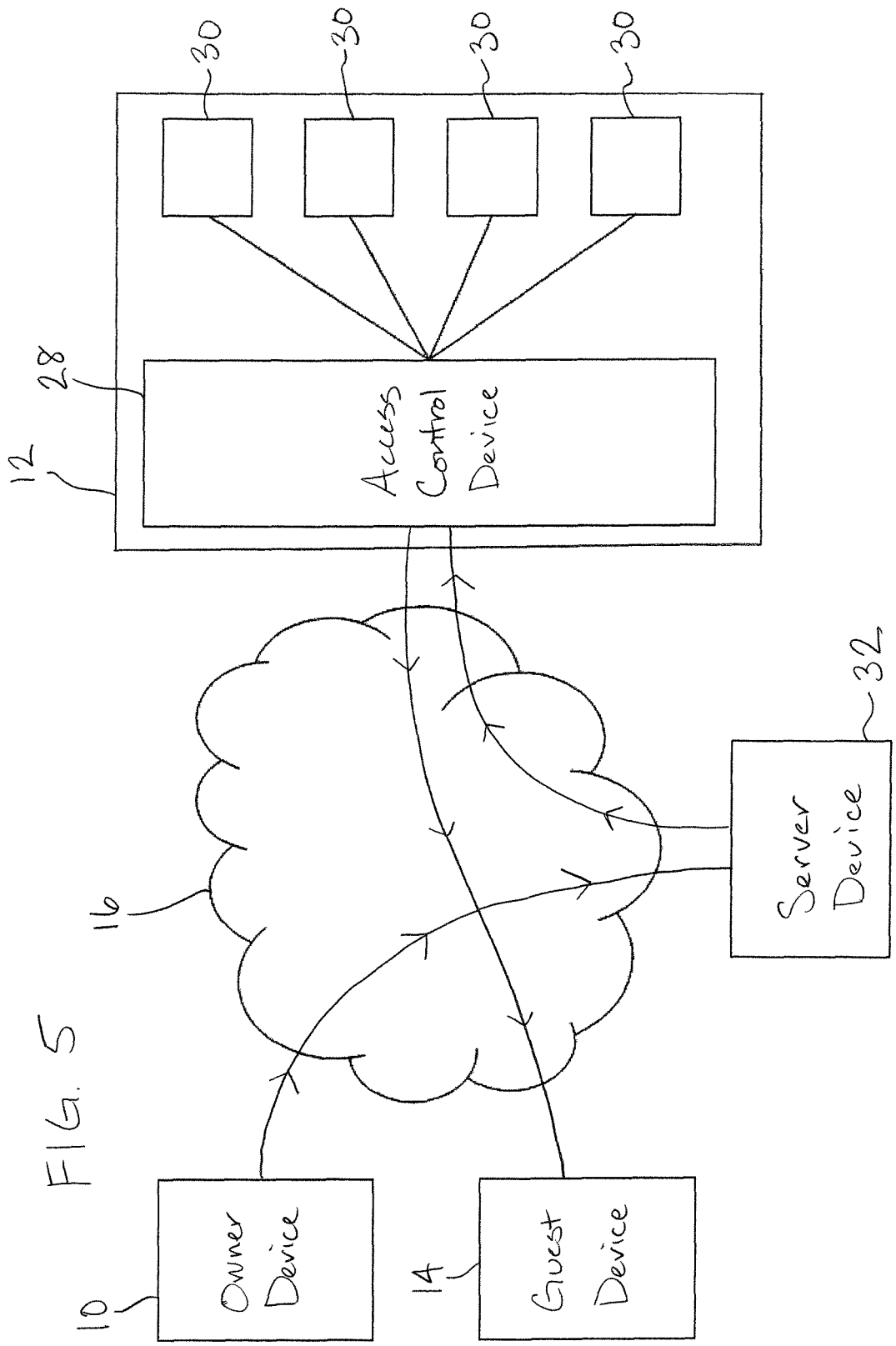
FIG. 5 is a schematic diagram showing communication to send access rights to a guest device from an owner device to a third party server device to an access control device to the guest device.

Other example communication configurations, as shown in FIGS. 4 and 5, include both the access control device 28 and the intermediary server 32. In a first approach of FIG. 4, the owner device 10 sends the request to the access control device 28, similar to that described above, then the access control device 28 forwards the request to the intermediary server 32. The intermediary server 32 assumes responsibility for sending the access rights data to the guest device 14. In a second approach of FIG. 5, the owner device 10 sends the request to the intermediary server 32, similar to that described above, then the intermediary server 32 forwards the request to the access control device 28. The access control device 28 assumes responsibility for sending the access rights data to the guest device 14. In either of these approaches, as discussed previously, the access rights data can be sent from any of the owner device 10, the access control device 28, or the intermediary server 32.

By other approaches, as shown in FIG. 6, exchange of information, including the application and/or the access rights data, can utilize near field communication (NFC) between the owner and guest devices 10 and 14. In these approaches, the owner and guest bring their respective owner and guest devices 10 and 14 within short range, i.e., within about few inches, of one another to transmit information back and forth. The owner device 10 can initiate the NFC with the guest device 14 in order to transfer the application directly to the guest device, and the guest device 14 can then download and install the application, as discussed previously. Moreover, the application itself can utilize NFC to transfer the access rights data to the guest device 14. In this approach, the owner device 10 can operate the application which utilizes NFC to initiate communication with the guest device and transfer the access rights data thereto. The application running on the guest device 14 can further make it receptive to the NFC transmission from the owner device. Alternatively, the owner device can transfer both the application and access rights within a single transmission. By other approaches, the guest device can initiate the NFC to request the various transmissions discussed above.

In all of the above communication examples, the application can include a self-test operation. Specifically, the self-test operation can cause the guest device 14, in response to reception of the access rights data, to send a test control signal to the access control device 28. The self-test operation can either do this automatically in response to reception and storage, can require the application to transmit the test control signal within a specified time, or can require the application to transmit the test control signal prior to a first use. The test signal can result in the access control device 28 and/or the secondary device 30 transmitting a confirmation signal in response to the test signal, which can be routed through the intermediary server 32. The confirmation signal can be transmitted to the guest device 14 and/or the owner device 10, as desired. Alternatively, operation of one of the secondary devices 30 by the guest device 14 can confirm to both the owner and operator that the transmission of the access rights data was successful. In another example, the test control signal can be configured by the application to cause a specified action with one of the secondary devices, such as chosen by the owner, so that the owner can identify when the transmission of the access rights data is successful. For example, the owner can tell the application to energize a specific light, send a test signal to an alarm, or other audio and/or visual actions.

Turning now to examples of operation of the interaction between the guest device 14 and the access control device 28 after the guest device 14 successfully receives the access rights data from the owner device 10, as shown in FIGS. 7-11.

Figure 7:
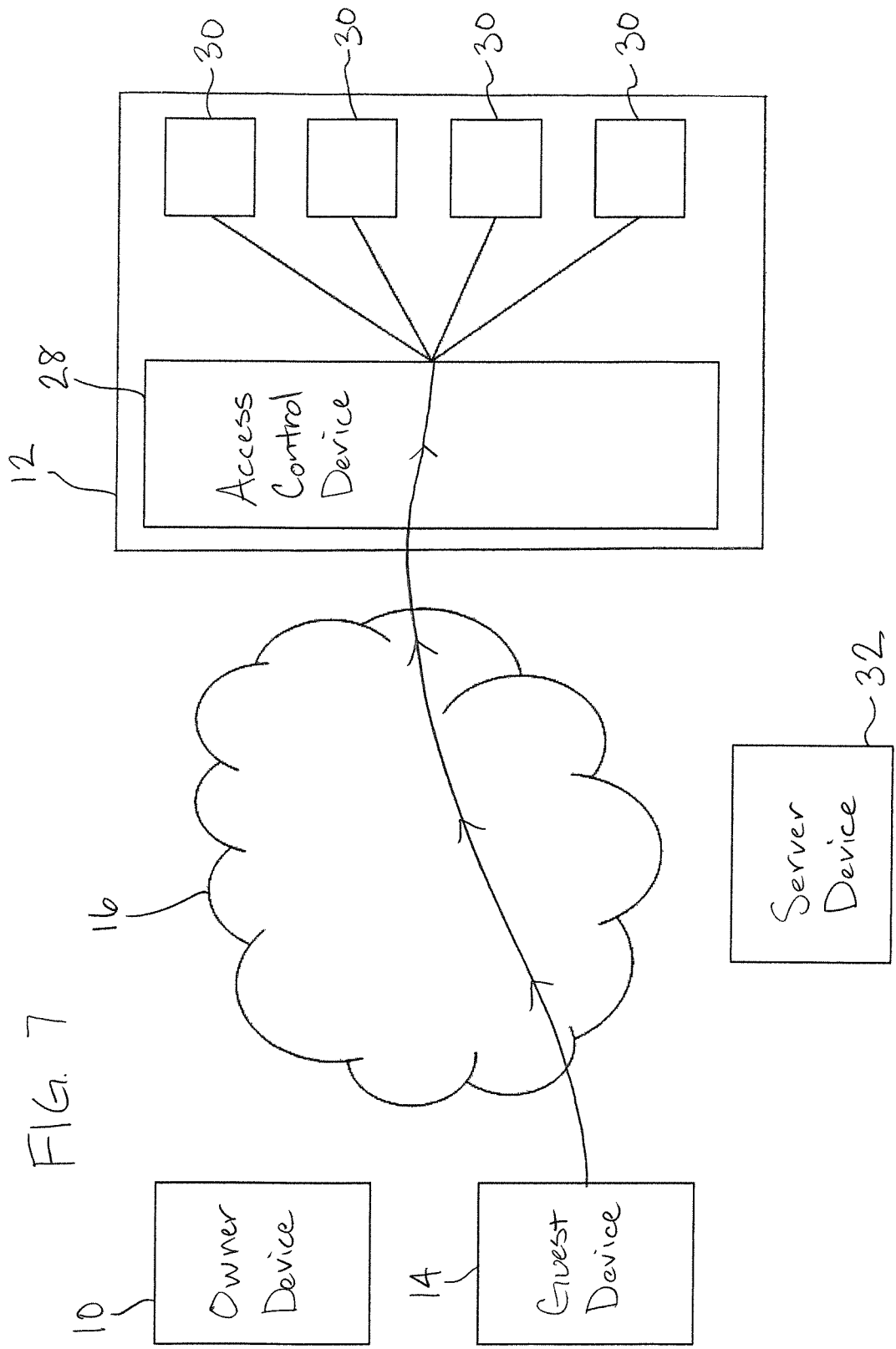
FIG. 7 is a schematic diagram showing communication to grant a guest device access to an access control device from the guest device to the access control device.

In the most straightforward example, as shown in FIG. 7, the guest runs and operates the application on the guest device 14 to send an authorized control signal directly to the access control device 28 identified in the access rights data through a communication network 16. The authorized control signal identifies a desired action to be performed at the secondary device 30. The access control device 28, in response to reception and verification of the credentials of the control signal from the guest device 14, then causes the desired action at the secondary devices 30, either by performing the action in the integral example or by translation of the control signal to a device specific language and sending the control signal to the separate secondary device 30.

Figure 8:
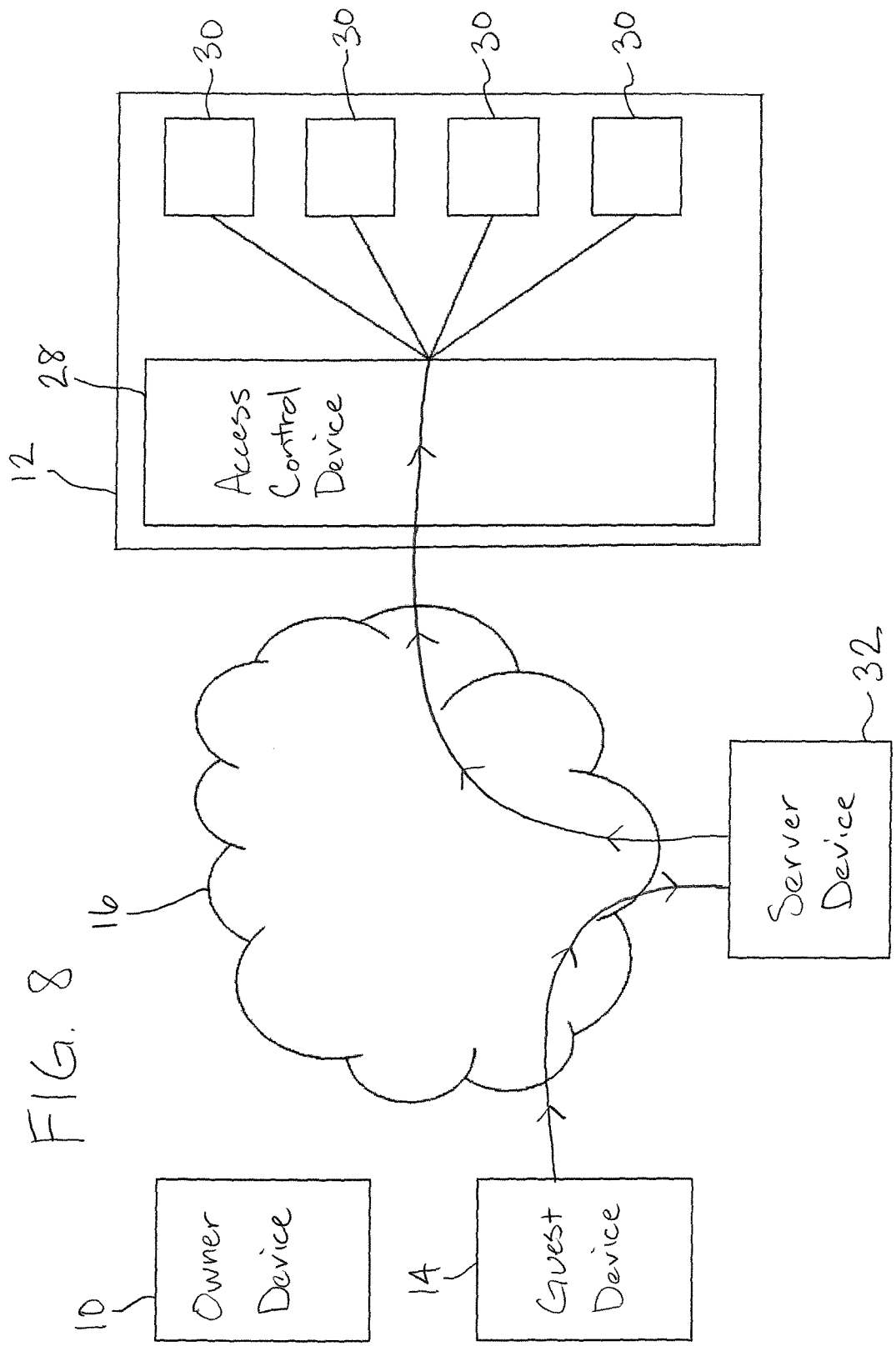
FIG. 8 is a schematic diagram showing communication to grant a guest device access to an access control device from the guest device to a third party server device to the access control device.

In another example, as shown in FIG. 8, the intermediary server 32 can act as a relay for the authorized control signal from the guest device 14. In this example, the application operating on the guest device 14 causes the control signal to be transmitted to the intermediary server 32 through the communication network 16, which then forwards the control signal to the access control device 28 identified by the application. If desired, the intermediary server 32 can log each control signal sent from the guest device 14. This is particularly advantageous in a situation where guest access control is purchased by the guest. The server logging each time a control signal is received from guest device 14 can allow the owner to charge for each control usage. By another approach, the owner can configure or request the intermediary server 32 to deny access control rights to an identified guest device 14 at times chosen by the owner. This is advantageous in an example where a guest prepays for access control and the guest does not have a sufficient balance, or the guest has a balance due.

Figure 9:
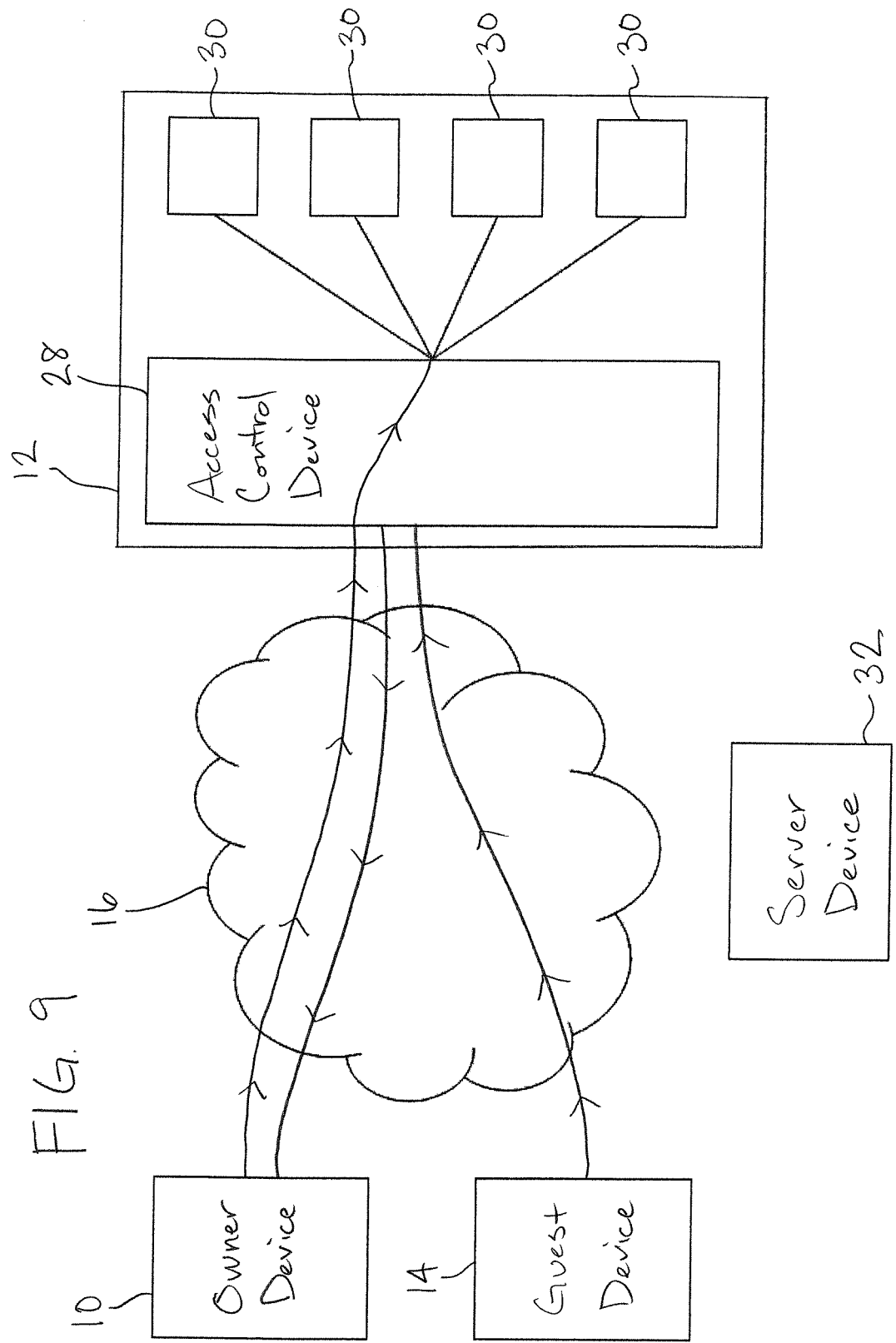
FIG. 9 is a schematic diagram showing communication to grant a guest device access to an access control device from the guest device to the access control device, and the access control device confirming authorization of the guest device with an owner device.
Figure 10:
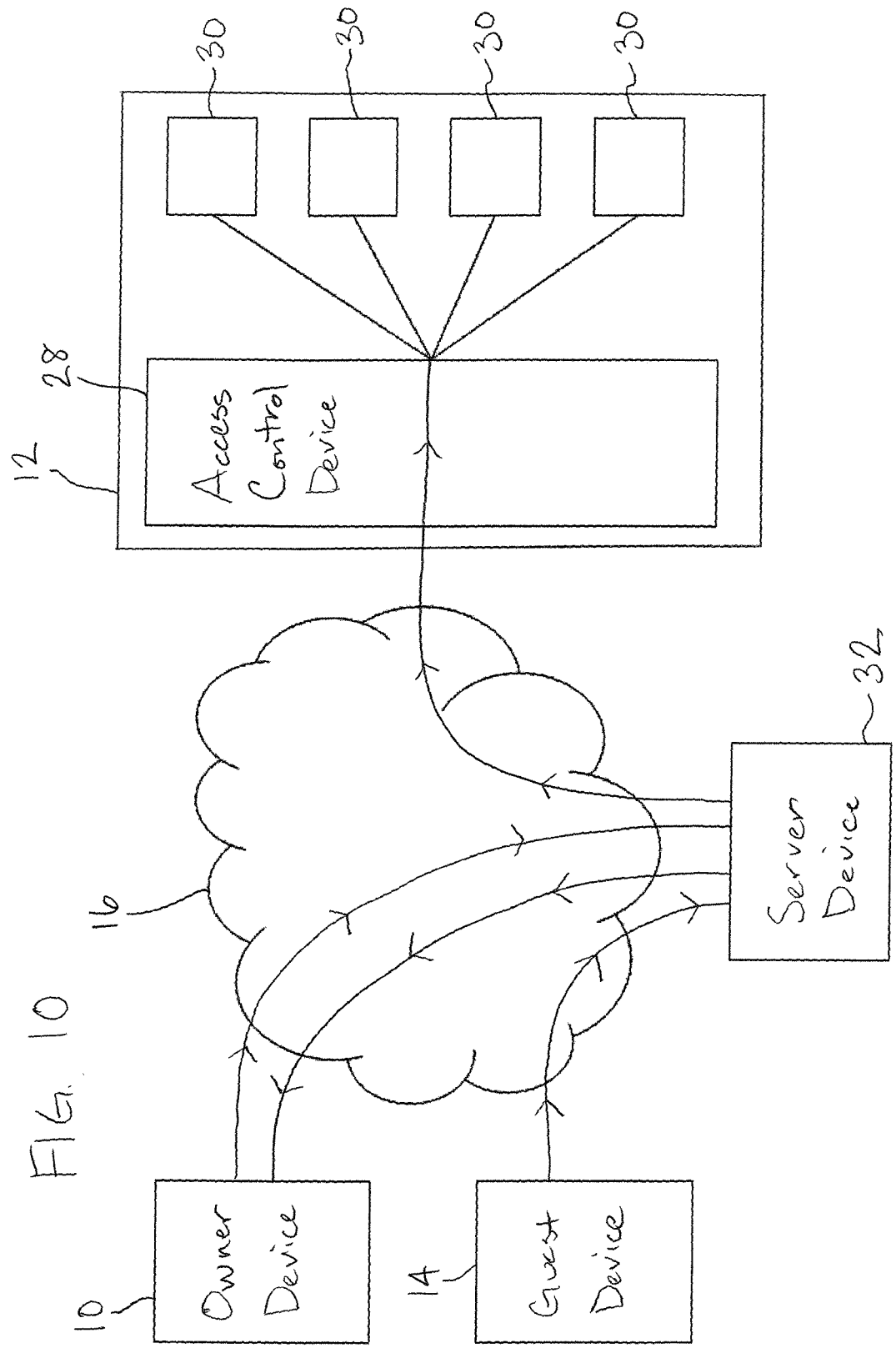
FIG. 10 is a schematic diagram showing communication to grant a guest device access to an access control device from the guest device to a third party device, the third party server device confirming authorization of the guest device with an owner device, and the third party communicating with the access control device.
Figure 11:
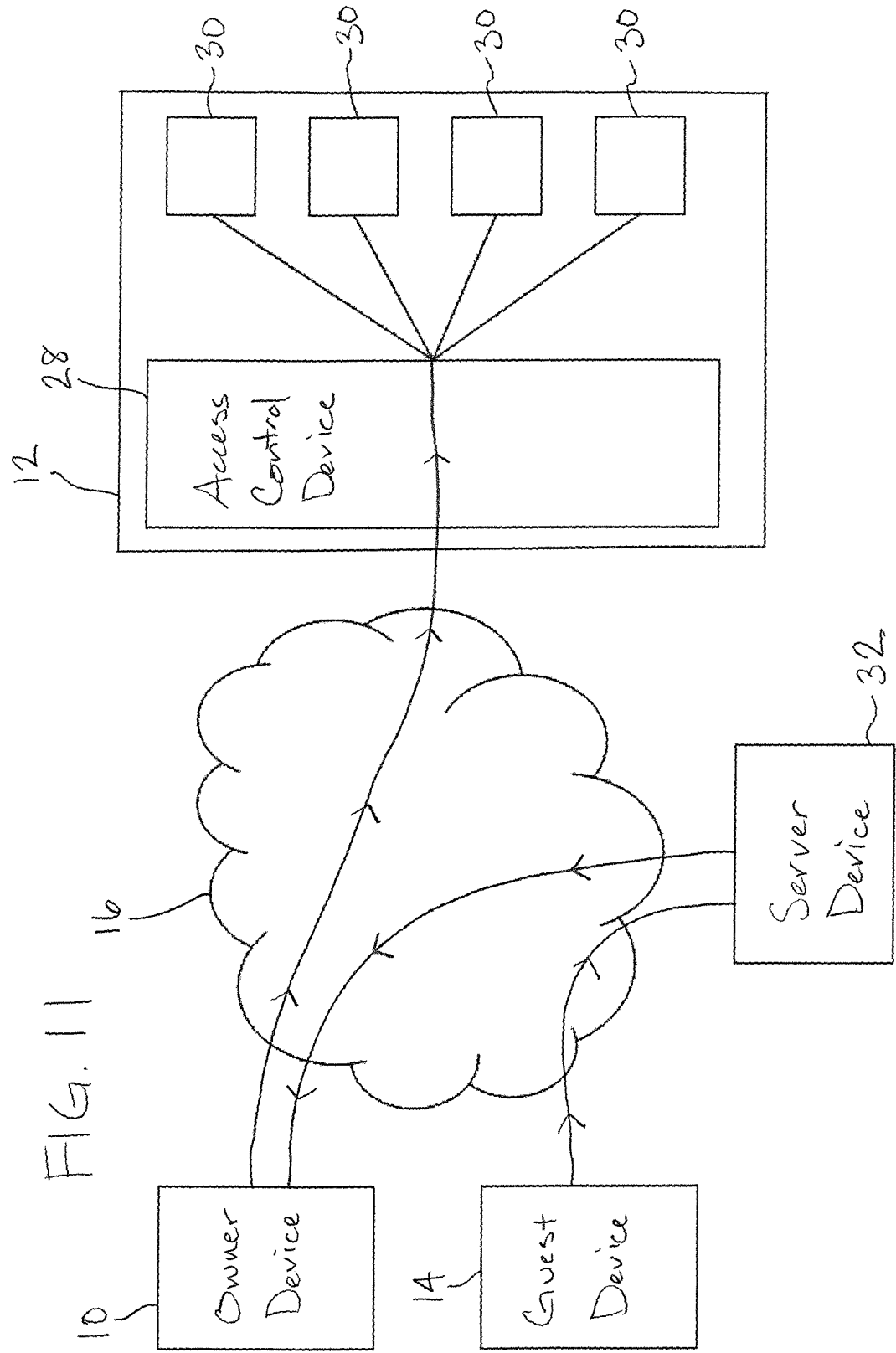
FIG. 11 is a schematic diagram showing communication to grant a guest device access to an access control device from the guest device to a third party server device, the third party service device confirming authorization of the guest device with an owner device, and the owner device communicating with the access control device.

In the examples shown in FIGS. 9-11, the owner device 10 is requested to confirm each attempt of the guest device 14 to send a control signal to the access control device 28. In a first example of FIG. 9, the guest device 14 transmits an authorized control signal to the access control device 28, similar to the operation discussed with respect to FIG. 7. Instead of directly passing the control signal to the identified secondary device 30, however, the access control device 28 instead transmits a confirmation request signal or message to the owner device 14. The confirmation request signal allows an owner to admit or deny the request of the guest device 14. For example, the application can display an interface with "admit" and "deny" access control options for the owner to select. If the owner denies access, the application identifies the decision and transmits a denial signal or message to the access control device 28, which then denies access to the guest device and does not cause the requested action to be performed. The access control device 28 can also send a denial confirmation signal or message to the guest device 14 to inform the guest of the owner's decision. If the owner allows access, the application identifies the decision and transmits an allow signal or message to the access control device 28, which then performs the requested action at the secondary device 30 or translates the control signal and passes the signal onto the identified secondary device 30 to perform the requested action.

In a second example of FIG. 10, the guest device transmits an authorized control signal to the intermediary server 32, similar to the operation discussed with respect to FIG. 8. Instead of passing the control signal to the access control device 28, however, the intermediary server 32 instead routes the guest's requested control signal or message to the owner device 14. This allows the owner to admit or deny the guest access. If the owner denies access, the application identifies the decision and transmits a denial signal or message to the intermediary server 32, which then refuses to forward the control signal onto the access control device 28. The intermediary server 32 can also send a denial confirmation signal or message to the guest device 14 to inform the guest of the owner's decision. If the owner allows access, the application identifies the decision and transmits an allow signal or message to the intermediary service 32, which then forwards the guest's control signal to the access control device 28. As discussed above, the access control device 28 then performs the requested action at the secondary device 30 or translates the control signal and passes the signal onto the identified secondary device 30 to perform the requested action.

In another example of FIG. 11, the guest device transmits an authorized control signal to the intermediary server 32. Instead of passing the control signal to the access control device 28, however, the intermediary server 32 instead routes the guest's requested control signal or message to the owner device 14, similar to the operation discussed with respect to FIG. 10. In this example, however, the owner is given the task of forwarding the control signal to the access control device 28. This provides an alternative method for the owner to admit or deny the guest access. If the owner denies access, the application can simply not forward the control signal to the access control device 28. If desired, the application can also transmit a denial signal or message back to the intermediary server 32, which can then send the denial message to the guest device 14 to inform the guest of the owner's decision, or to the guest device 14 directly. If the owner allows access, the application identifies the decision and forwards the guest's control signal to the access control device 28. As discussed above, the access control device 28 then performs the requested action at the secondary device 30 or translates the control signal and passes the signal onto the identified secondary device 30 to perform the requested action.

By a further approach, diagnostic application software ("application") for a mobile device and/or computing device can allow an owner or operator of a premises to provide a service technician or service company ("technician") access to usage and/or operational data from a movable barrier operator so that the technician can troubleshoot for possible issues with the operation of the barrier operator. The application facilitates efficient diagnostic analysis without requiring the owner to be physically present with the technician. Pursuant to this, the owner can operate the application to send credentials to the technician mobile device so that the technician can then utilize the application to access the operational data. For added security, the application can further give the owner control over the type and duration of access provided to the technician.

Pursuant to this, the barrier operator can include or have a monitoring program installed that continuously or periodically records its operational data to a local or network-based storage device. The operational data can be as detailed or as basic as desired. For example, the operational data can include times of operation, length of operation, distance traveled by the barrier, motor rotations per minute, obstacle detections, age of the unit, and the like.

Details of the interacting components and structure of this system are also discussed with references to FIGS. 1-12. As with the earlier form, the owner device 10, the guest device 14, the server device 32, and the access control device 28 communicate via one or more of the communication networks 16. In this instance, however, the guest device 14 refers specifically to the device of the technician and the access control device 28 refers to the movable barrier operator. The diagnostic application, similar to the application discussed above, can be available for purchase and/or download from any desired source over the communication network 16.

As with the previous application, the diagnostic application utilizes access rights data that includes identification information of the barrier operator 28 and corresponding authorization information for access rights to the barrier operator 28. In other words, the access rights data includes credentials required by the barrier operator 28, a conditional requirement for allowing the credentials, and the identification information. In this form, however, the credentials can have two tiers of access: a first tier that provides access rights to the operational data of the barrier operator 28 and a second tier that provides access rights for operation of the barrier operator 28. Accordingly, the application gives the owner control over the scope of access provided to the technician. For some purposes, access to the operational data itself will be sufficient to troubleshoot a barrier operator 28, such as to give the barrier operator 28 a clean bill of health or to diagnose a problem that will require additional follow up, such as ordering a needed part or setting up an inspection date. The application therefore allows the owner to avoid providing physical access to the premises until physical access is needed.

If desired, the application can cause the access rights data to be stored in the memory 22 of the owner device 10 for ease of providing it to a third party. By one approach, the access rights data can be manually entered by the owner through the user input 18 of the owner device 10, by download from the access control device 28, by retrieving or receiving the access rights data from a network device, or the application can have a learn mode similar to a learning transmitter known in the art so that the owner device 10 receives and stores the information from a transmission of an authorized transmitter. Thus, if desired, the application can provide the owner with transmitter functionality to send an authorized control signal to the access control device 28 with the owner device 10. In this form, once the owner gave authorization to send the access rights data to the technician device 14, the application would pull the access rights from the owner device 10 to send to the technician device 14.

Alternatively, the access rights data can be stored on one or more secondary computing devices, such as devices of the owner, the barrier operator company, a service company, or other third parties. As such, the owner could enter the access rights data as discussed above, but instead of local storage, the application would cause the access rights data to be stored on the secondary computing device. In this alternative form, the application causes the third party device to send the access rights to the technician device in response to instruction by the owner.

In another form, the application can work in conjunction with a web page or website. For example, the owner can input relevant information or grant access to the technician via a web page associated with the application so that the information is saved on a server device, such as a service device associated with one of the third parties set forth above, and accessible via the application.

As with the above application, notifying the service technician of the application can take any desired form. Regardless of how the technician is notified of the application, however, the technician, or a company associated with the technician, can then purchase, download, and install the application on the technician device 14.

The technician can get access to the operational data in any suitable way. By one approach, as discussed above, the barrier operator 28 stores the operational data locally and the owner sends credentials to the technician device 14. These credentials can allow the technician to question the barrier operator 28 regarding the operational data or can allow the technician to pull the operational data from the barrier operator 28. This can be achieved through a relatively short range media, such as Bluetooth or radio communication, but can also be achieved through an internet connection if the barrier operator is capable of connecting to the internet. In another approach, the owner can allow the technician device 14 to access the credentials stored in a third party computing device. In this approach, the technician can utilize the application to retrieve the credentials and then question or pull the operational data as before.

As discussed above, the owner can specify whether the technician is granted first or second tier credentials for accessing the barrier operator 28. To further protect the owner, the application can also temporally limit any access rights granted to the technician. For example, the owner can limit the credentials to a specific duration of time, which can begin immediate in response to sending the credentials or after the technician first uses the credentials, as desired. Alternatively, or in addition, the credentials can be limited to a specified number of uses. These mechanisms allow the technician to access and repair the barrier operator 28 without being granting unlimited access.

In an additional or alternative form, the owner can set up a relationship with a service technician or company for monitoring and servicing of the barrier operator 28. In this form, the owner gives approval to the technician to access the credentials or sends the credentials to the technician via the application prior to intended use. Then, the computing device hosting the application can receive continual or periodic operational data reports from the barrier operator 28. In one form, the application can be configured to identify potential issues with the operation of the barrier operator 28. For example, potential issues can include that the barrier operator fails to operate in response to receipt of an operation signal, the time of operation of the barrier operator to perform a task has risen above a threshold, a predetermined amount of time has passed between review/maintenance, or the like. In response to a determination that further review is needed, the application can notify the technician via sounds, banners, vibrations, messages, or combinations thereof. The technician can then access the operational data via the application to determine whether maintenance or repair is needed.

The application can further include a communication functionality so that the owner and technician can communicate back and forth while operating the application. These communications can take any suitable form, including text messages, video, email, internet based chat, or the like.

The diagnostic application can further include a self-test operation, similar to that discussed above. The self-test operation can cause the technician device 14, in response to reception of the access rights data, to send a test signal to the barrier operator 28. The self-test operation can either do this automatically in response to reception and storage, can require the application to transmit the test control signal within a specified time, or can require the application to transmit the test signal prior to a first use. If desired, the test signal can cause the barrier operator 28 to transmit a confirmation signal, which can be routed through the intermediary server 32. The confirmation signal can be transmitted to the technician device 14 and/or the owner device 10, as desired. Alternatively, successful retrieval of the operational data or operation of the barrier operator by the technician device 14 can confirm to both the owner and operator that the transmission of the access rights data was successful.

As with the previous embodiment, the diagnostic application can facilitate communication between the technician device 14 and the barrier operator 28 via several different communication paths, shown in FIGS. 7-11, after the technician device 14 has successfully received the access rights data.

In the most straightforward example, as shown in FIG. 7, the technician runs and operates the application on the technician device 14 to send an authorized signal directly to the barrier operator 28 identified in the access rights data through a communication network 16. The technician indicates a desired action to be performed at the barrier operator, i.e., questioning/pulling operational data, operation of the barrier operator, etc. The barrier operator 28, in response to reception and verification of the credentials of the signal from the technician device 14, then performs the action, either retrieving and transmitting the operational data to the technician device 14, causing the operational data to be transmitted to the technician device 14, or moving a movable barrier operably coupled to the barrier operator.

In another example, as shown in FIG. 8, the intermediary server 32 can act as a relay for the authorized signal from the technician device 14. In this example, the application operating on the technician device 14 causes the signal to be transmitted to the intermediary server 32 through the communication network 16, which then forwards the signal to the barrier operator 28 identified by the application. If desired, the intermediary server 32 can log each signal sent from the technician device 14. The server logging each time a signal is received from technician device 14 can allow the owner to monitor the activities of the technician. By another approach, the owner can configure or request the intermediary server 32 to deny access control rights to an identified technician device 14 at times chosen by the owner.

In the examples shown in FIGS. 9-11, the owner device 10 is requested to confirm each attempt of the technician device 14 to send a signal to the barrier operator 28. In a first example of FIG. 9, the technician device 14 transmits an authorized signal to the barrier operator 28, similar to the operation discussed with respect to FIG. 7. Instead of immediately performing the requested action, however, the barrier operator 28 instead transmits a confirmation request signal or message to the owner device 10. The confirmation request signal allows an owner to admit or deny each request of the technician device 14. For example, the application can display an interface with "admit" and "deny" access control options for the owner to select. If the owner denies access, the application identifies the decision and transmits a denial signal or message to the barrier operator 28, which then denies access to the technician device and does not perform the requested action. The barrier operator 28 can also send a denial signal or message to the technician device 14 to inform the technician of the owner's decision. If the owner allows access, the application identifies the decision and transmits an allow signal or message to the barrier operator 28, which then performs the requested action.

In a second example of FIG. 10, the technician device 14 transmits an authorized signal to the intermediary server 32, similar to the operation discussed with respect to FIG. 8. Instead of passing the signal to the barrier operator 28, however, the intermediary server 32 instead routes the technician's requested signal or message to the owner device 10. This allows the owner to admit or deny the technician access. If the owner denies access, the application identifies the decision and transmits a denial signal or message to the intermediary server 32, which then refuses to forward the signal onto the barrier operator 28. The intermediary server 32 can also send a denial confirmation signal or message to the technician device 14 to inform the technician of the owner's decision. If the owner allows access, the application identifies the decision and transmits an allow signal or message to the intermediary service 32, which then forwards the technician's signal to the barrier operator 28. As discussed above, the barrier operator 28 then performs the requested action.

In another example of FIG. 11, the technician device 14 transmits an authorized control signal to the intermediary server 32. Instead of passing the signal to the barrier operator 28, however, the intermediary server 32 instead routes the technician's requested signal or message to the owner device 10, similar to the operation discussed with respect to FIG. 10. In this example, however, the owner is given the task of forwarding the signal to the barrier operator 28. This provides an alternative method for the owner to admit or deny the technician access. If the owner denies access, the application can simply not forward the signal to the barrier operator 28. If desired, the application can also transmit a denial signal or message back to the intermediary server 32, which can then send the denial message to the technician device 14 to inform the technician of the owner's decision, or to the technician device 14 directly. If the owner allows access, the application identifies the decision and forwards the technician's signal to the barrier operator 28. As discussed above, the barrier operator 28 then performs the requested action.

In operation, the owner can determine that the barrier operator needs servicing, whether from routine maintenance or as a result of unsatisfactory operation. The owner then, if necessary, downloads, installs, and runs the application to obtain/enter the access rights data for the barrier operator. The owner then contacts the service technician or an associated service company about the service call and notifies them of the application. After the technician installs the application, the owner identifies the technician by technician identification information, such as a telephone number, email address, a user name created within the application, or the like. The owner then sets limits, if desired, on the grant of access to the barrier operator and instructs the application to send the credentials to the technician device. The technician then uses the credentials to access the operational data to troubleshoot for issues with the barrier operator. If necessary, the technician can request operational access to the barrier operator by sending a request to the owner device. In response, the owner can instruct the application to expand the access rights granted to the technician to the second tier. The technician can also request additional time if the limits set on the credentials run out prior to finishing the service call. After the technician has finished the service call, the technician can communicate the result of the call with the owner and the owner can instruct the application to rescind the access rights data if desired.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A technician device comprising:
   a receiver configured to receive one or more transmissions over a communication network at the behest of an owner device, the transmissions including at least application identification information and access rights data to an owner movable barrier operator;
   a processor device configured to download, install, and run an application identified by the application identification information;
   a user input device, the application configured to receive instruction from the user input device;
   a transmitter configured to transmit a signal based on the access rights data, after a determination by the processor device that there are no applicable restrictions in the access rights data, to the owner movable barrier operator in response to instruction from the application to access operational data of the owner movable barrier operator, wherein the operational data consists of one or more of: times of operation, length of operation, distance traveled, motor rotations per minute, obstacle detections, and age; and wherein the receiver is further configured to receive, from the owner movable barrier operator in response to transmission of the signal, the operational data of the owner movable barrier operator.

2. The technician device of claim 1 wherein the access rights data comprises movable barrier operator identification information and credentials for authorized communication with the owner movable barrier operator.

3. The technician device of claim 2 wherein the access rights data further comprises restrictions on the use of the credentials.

4. The technician device of claim 2 wherein the credentials indicate one of at least two tiers of access to the owner movable barrier operator.

5. The technician device of claim 4 wherein the at least two tiers of access include a first tier that allows access to the operational data and a second tier that allows access to send a control signal to operate the owner movable barrier operator.

6. The technician device of claim 1 wherein the application identification information comprises a link to download the application.

7. The technician device of claim 1 wherein the receiver and transmitter are configured to communicate with the owner movable barrier operator using a short range communication standard.

8. The technician device of claim 1 further comprising a storage device having the application stored thereon.

9. The technician device of claim 1 wherein the storage device further has the operational data stored thereon.

10. The technician device of claim 1 wherein the receiver and transmitter are further configured to enable two-way communication with an owner device via the application.

11. A method comprising:
receiving, at a receiver of a technician device over a communication network, one or more transmissions triggered by an owner device, the transmissions including at least application identification information and access rights data to provide access to an owner movable barrier operator;
operating the application on the technician device;
determining, by the technician device, whether there are any applicable restrictions in the access rights data;
receiving an instruction signal from a user input device of the technician device;
transmitting a signal with a transmitter of the technician device, in response to the instructional signal and the determining that there are no applicable restrictions in the access rights data, to the owner movable barrier operator via the application to access operational data of the owner movable barrier operator, wherein the operational data consists of one or more of: times of operation, length of operation, distance traveled, motor rotations per minute, obstacle detections, and age: and
receiving, from the owner movable barrier operator in response to the transmitting the signal, the operational data of the owner movable barrier operator.

12. The method of claim 11 wherein communication with the owner movable barrier operator is performed using a short range communication standard.

13. The method of claim 11 wherein transmitting the signal to the owner movable barrier operator comprises questioning the movable barrier operator about the operational data.

14. The method of claim 11 wherein receiving the access rights data comprises receiving owner movable barrier operator identification information and credentials for authorized communication with the owner movable barrier operator.

15. The method of claim 14 wherein receiving the credentials comprises receiving credentials subject to temporal restrictions.

16. The method of claim 14 wherein receiving the credentials comprises receiving a first tier credential that allows access to the operational data.

17. The method of claim 16 wherein receiving the credentials further comprises receiving a second tier credential that allows access to send a control signal to move a movable barrier with the owner movable barrier operator.

18. The method of claim 11 further comprising communicating with the owner device via the receiver and transmitter with the application.

19. The method of claim 11 further comprising transmitting a self-test signal to determine whether the access rights data were successfully received.

20. The method of claim 11 further comprising transmitting a control signal to the owner movable barrier operator to move a movable barrier with the movable barrier operator.

21. An apparatus comprising:
a processor device configured to run an application;
an interface configured to receive input to instruct the application to send a package to a technician device, the package comprising identification information for the application and access rights data for an owner movable barrier operator;
a transmitter configured to send the package to the technician device via the application, the application and the access rights data configured to allow the technician device to send a signal, after a determination by the technician device that there are no applicable restrictions in the access rights data, to the owner movable barrier operator to then prompt receipt, from the owner movable barrier operator, operational data of the owner movable barrier operator, wherein the operational data consists of one or more of: times of operation, length of operation, distance traveled, motor rotations per minute, obstacle detections, and age;
the processor device further configured to send an authorized control signal via the transmitter to operate the owner movable barrier operator.

22. The apparatus of claim 21 further comprising a storage device configured to store at least one of the application and the access rights data thereon.

23. The apparatus of claim 21 further comprising a receiver configured to receive one or more communications from the technician device through the application.

24. The apparatus of claim 23 wherein the receiver is further configured to receive a confirmation signal in response to the technician device successfully receiving the package via the application.

25. The apparatus of claim 23 wherein the receiver is further configured to receive the signal from the technician device via the application, and wherein the transmitter is further configured to transmit the signal to the owner movable barrier operator.

26. The apparatus of claim 25 wherein the application is configured to present an option on the interface to deny transmitting the signal to the owner movable barrier operator.

27. The apparatus of claim 21 wherein the application is configured to present an option on the interface to temporally restrict the access rights data.

28. The apparatus of claim 21 wherein the access rights data configured to allow the technician device to send the signal to the owner movable barrier operator to access the operational data comprises a first tier credential, and the application is configured to present an option on the interface to include a second tier credential to the technician device configured to allow the technician device to send a control signal to move a movable barrier with the owner movable barrier operator.

29. The apparatus of claim 28 wherein the transmitter configured to transmit the access rights data comprises the transmitter configured to transmit the first and second tier credentials.

30. A method comprising:
running an application on an owner device;
receiving application identification information and access rights data for accessing operational data of an owner movable barrier operator at the owner device;
transmitting a package to a technician device, the package comprising the application identification information and the access rights data configured to allow the technician device to send a signal, after determination by the technician device that there are no applicable restrictions in the access rights data, to the owner movable barrier operator to then prompt receipt, from owner movable barrier operator, the operational data of the owner movable barrier operator, wherein the owner device is configured to send an authorized control signal via the transmitter to operate the owner movable barrier operator, wherein the operational data consists of one or more of: times of operation, length of operation, distance traveled, motor rotations per minute, obstacle detections, and age.

31. The method of claim 30 further comprising communicating with the technician device via the application.

32. The method of claim 30 wherein the application identification information and the access rights data are transmitted via separate transmissions.

33. The method of claim 30 wherein transmitting the package to the technician device comprises transmitting the package to an intermediary server device, with the intermediary server device transmitting the package to the technician device.

34. The method of claim 30 further comprising receiving a confirmation signal from the technician device in response to successful reception of the package.

35. The method of claim 30 wherein receiving the access rights data comprises receiving owner movable barrier operator identification information and credentials for authorized communication with the owner movable barrier operator.

36. The method of claim 35 wherein receiving credentials comprises receiving a first tier credential configured to allow the technician device to send a signal to the owner movable barrier operator to access the operational data and a second tier credential configured to allow the technician device to send a control signal to move a movable barrier with the owner movable barrier operator.

37. The method of claim 35 further comprising receiving temporal restrictions on the use of the credentials via a user input of the owner device.

\* \* \* \* \*

UNITED STATES PATENT AND TRADEMARK OFFICE
CERTIFICATE OF CORRECTION

PATENT NO. : 9,449,449 B2
APPLICATION NO. : 14/473045
DATED : September 20, 2016
INVENTOR(S) : Patrick B. Evans and Edward Sullivan It is certified that error appears in the above-identified patent and that said Letters Patent is hereby corrected as shown below:

In the Claims

Claim 11, Column 15, Line 50: Delete "instructional" and insert -- instruction --, and Claim 30, Column 17, Line 28: After "from" insert -- the --.

Signed and Sealed this
Second Day of May, 2017

Michelle K. Lee
*Director of the United States Patent and Trademark Office*